(12) United States Patent
Huang et al.

(10) Patent No.: US 10,848,359 B2
(45) Date of Patent: Nov. 24, 2020

(54) VIRTUAL SYMBOL SPLITTING TECHNIQUES IN WIRELESS COMMUNICATIONS

(71) Applicant: QUALCOMM Incorporated, San Diego, CA (US)

(72) Inventors: Yi Huang, San Diego, CA (US); Peter Gaal, San Diego, CA (US); Wei Zeng, San Diego, CA (US); Wanshi Chen, San Diego, CA (US); Hao Xu, Beijing (CN); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 15/673,690

(22) Filed: Aug. 10, 2017

(65) Prior Publication Data
US 2018/0097671 A1 Apr. 5, 2018

Related U.S. Application Data

(60) Provisional application No. 62/402,470, filed on Sep. 30, 2016.

(51) Int. Cl.
*H04L 27/26* (2006.01)
*H04L 5/00* (2006.01)

(52) U.S. Cl.
CPC ........ *H04L 27/2605* (2013.01); *H04L 5/0023* (2013.01); *H04L 5/0044* (2013.01);
(Continued)

(58) Field of Classification Search
CPC .............. H04L 27/2605; H04L 5/0007; H04L 27/2613; H04L 27/2602; H04L 5/0048;
(Continued)

(56) References Cited

U.S. PATENT DOCUMENTS

| | | | |
|---|---|---|---|
| 8,352,832 B2 | 1/2013 | Khisti et al. | |
| 8,526,412 B2 * | 9/2013 | Vijayan | H04L 5/0007 370/344 |

(Continued)

FOREIGN PATENT DOCUMENTS

| | | |
|---|---|---|
| WO | WO2016085381 A1 | 6/2016 |
| WO | WO2017013467 A1 | 1/2017 |

OTHER PUBLICATIONS

ISA/EP, International Search Report and Written Opinion of the International Searching Authority, Int'l Application No. PCT/US2017/046515, dated Nov. 10, 2017, European Patent Office, Rijswijk, NL, 15 pgs.

(Continued)

*Primary Examiner* — David C Payne
*Assistant Examiner* — Sarah Hassan
(74) *Attorney, Agent, or Firm* — Kevin M. Donnelly

(57) ABSTRACT

Techniques are described that provide for virtual symbol splitting for uplink and/or downlink wireless transmissions. A wireless transmitter, such as a UE or a base station, may identify a pilot signal and a payload to be transmitted in a full symbol. The transmitter may format the pilot signal and the payload into separate sub-symbols that are nested within the first full symbol, with each sub-symbol including an associated sub-symbol cyclic prefix, and the full symbol including a full symbol cyclic prefix.

12 Claims, 16 Drawing Sheets

(52) U.S. Cl.
CPC ......... *H04L 5/0048* (2013.01); *H04L 27/261* (2013.01); *H04L 27/2602* (2013.01); *H04L 27/2628* (2013.01); *H04L 27/2636* (2013.01)

(58) Field of Classification Search
CPC . H04L 27/2607; H04L 5/0051; H04L 5/0044; H04L 5/0094; H04L 27/2636; H04L 5/0023; H04L 5/005; H04L 1/0083; H04L 27/2634; H04L 27/2656; H04L 27/2608
USPC .......................................... 375/220; 370/329
See application file for complete search history.

(56) References Cited

U.S. PATENT DOCUMENTS

| | | | |
|---|---|---|---|
| 8,730,933 | B2 | 5/2014 | Luo et al. |
| 8,913,672 | B2 | 12/2014 | Luo et al. |
| 9,147,193 | B2 | 9/2015 | Papasakellariou et al. |
| 2006/0115010 | A1 | 6/2006 | Rog et al. |
| 2009/0040919 | A1 | 2/2009 | Muharemovic et al. |
| 2009/0097465 | A1* | 4/2009 | Inoue .................... H04L 5/0048 370/342 |
| 2010/0178057 | A1* | 7/2010 | Shieh .................. H04L 25/0224 398/79 |
| 2016/0135086 | A1* | 5/2016 | Yang .................... H04L 1/0025 370/343 |
| 2016/0165622 | A1 | 6/2016 | Luo et al. |
| 2018/0091350 | A1 | 3/2018 | Akkarakaran et al. |

OTHER PUBLICATIONS

Texas Instruments, "Uplink Reference Signals in Support of High-Speed UEs," 3GPP TSG RAN WG1 Meeting #51, R1-074678, Jeju, Korea, Nov. 5-9, 2007, 6 pgs., XP050108154, 3rd Generation Partnership Project.

Qualcomm Incorporated: "Channelization of short PUCCH," R1-1702631, 3GPP TSG-RAN WG1 #88, Athens, Greece, Feb. 13-17, 2017, 7 pages, retrieved from the URL: http://www.3gpp.org/ftp/tsg_ran/WG1_RL1/TSGR1_88/Docs/R1-1702631.zip.

* cited by examiner

VIRTUAL SYMBOL SPLITTING TECHNIQUES IN WIRELESS COMMUNICATIONS

CROSS REFERENCES

The present Application for Patent claims priority to U.S. Provisional Patent Application No. 62/402,470 by HUANG et al., entitled "Virtual Symbol Splitting Techniques in Wireless Communications," filed Sep. 30, 2016, assigned to the assignee hereof, and which is hereby expressly incorporated by reference herein in its entirety.

INTRODUCTION

The following relates generally to wireless communication, and more specifically to virtual symbol splitting techniques in wireless communications.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

In some examples, a wireless multiple-access communication system may include a number of base stations, each simultaneously supporting communication for multiple communication devices, otherwise known as user equipment (UEs). In a Long-Term Evolution (LTE) or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (radio heads (RHs)) in communication with a number of access node controllers (ANCs), where a set of one or more radio heads, in communication with an ANC, defines a base station (e.g., an eNB). A base station may communicate with a set of UEs on downlink (DL) channels (e.g., for transmissions from a base station to a UE) and uplink (UL) channels (e.g., for transmissions from a UE to a base station).

As communications providers continue to increase the capacity of wireless networks, and as demand for such capacity grows, efficient use of wireless resources becomes increasingly important for high quality and relatively low cost wireless communications. Efficient use of wireless resources may include providing available wireless resources with relatively low overhead in a manner that allows each UE being served to efficiently utilize network resources and enhance user experience.

SUMMARY

A method of wireless communication is described. The method may include identifying a pilot signal and a payload (e.g., data, control information, or both) to be transmitted in a first full symbol, where the first full symbol may include a first symbol cyclic prefix. That is, the payload may include data, control information, or any combination thereof. The pilot signal and the payload may then be formatted, for example, in the time domain, into separate sub-symbols that are nested within the first full symbol. In some cases, each sub-symbol may include an associated sub-symbol cyclic prefix. The first full symbol, including the nested sub-symbols, may then be transmitted to a receiver.

An apparatus for wireless communication is described. The apparatus may include means for identifying a pilot signal and a payload (e.g., data, control information, or both) to be transmitted in a first full symbol, where the first full symbol including a first symbol cyclic prefix, means for formatting the pilot signal and the payload into separate sub-symbols that are nested within the first full symbol. In some cases, each sub-symbol includes an associated sub-symbol cyclic prefix. The apparatus may include means for transmitting the first full symbol, including the nested sub-symbols, to a receiver.

Another apparatus for wireless communication is described. The apparatus may include a processor, memory in electronic communication with the processor, and instructions stored in the memory. The instructions may be operable to cause the processor to identify a pilot signal and a payload (e.g., data, control information, or both) to be transmitted in a first full symbol, where the first full symbol may include a first symbol cyclic prefix, format the pilot signal and the payload into separate sub-symbols that are nested within the first full symbol. In some cases, each sub-symbol may include an associated sub-symbol cyclic prefix. The apparatus may then transmit the first full symbol, including the nested sub-symbols, to a receiver.

A non-transitory computer readable medium for wireless communication is described. The non-transitory computer-readable medium may include instructions operable to cause a processor to identify a pilot signal and a payload (e.g., data, control information, or both) to be transmitted in a first full symbol, where the first full symbol may include a first symbol cyclic prefix, format the pilot signal and the payload into separate sub-symbols that are nested within the first full symbol, wherein each sub-symbol may include an associated sub-symbol cyclic prefix. The first full symbol, including the nested sub-symbols, may then be transmitted to a receiver.

In some examples of the method, apparatus, and non-transitory computer-readable medium described above, the sub-symbols include a first sub-symbol for transmission of the pilot signal and a second sub-symbol for transmission of the payload. In some examples of the method, apparatus, and non-transitory computer-readable medium described above, the sub-symbols include one or more sub-symbols for transmission of the pilot signal and one or more sub-symbols for transmission of the payload.

Some examples of the method, apparatus, and non-transitory computer-readable medium described above may further include processes, features, means, or instructions for identifying a first cyclic prefix length for the first symbol cyclic prefix, identifying a sub-symbol cyclic prefix length as the first cyclic prefix length divided by a number of the separate sub-symbols, formatting the pilot signal in front of the payload to be transmitted, identifying a tail portion of the pilot signal having the sub-symbol cyclic prefix length as a payload sub-symbol cyclic prefix, appending a copy of the payload sub-symbol cyclic prefix to the end of the payload in the payload sub-symbol, identifying a payload sub-symbol tail portion having the first cyclic prefix length, and inserting a copy of the identified payload sub-symbol tail portion in front of the pilot signal sub-symbol. Some examples of the method, apparatus, and non-transitory computer-readable medium described above may further include processes, features, means, or instructions for determining a length of the formatted pilot signals to a length of the formatted payload such that a ratio of the length of the formatted pilot signal to a length of the formatted payload may be an integer. In some examples of the method, apparatus, and non-transitory computer-readable medium described above, each sub-symbol includes an associated sub-symbol cyclic prefix. In some examples of the method, apparatus, and non-transitory computer-readable medium described above, the first symbol cyclic prefix may be outside of each of the sub-symbols in the first full symbol.

In some examples of the method, apparatus, and non-transitory computer-readable medium, a discrete Fourier transform (DFT) may be performed on the pilot signal and the payload sub-symbol after the appending. In some cases, the DFT may be performed using a same (i.e., common) DFT for the pilot signal and the payload sub-symbol. Some examples of the method, apparatus, and non-transitory computer-readable medium described above may further include processes, features, means, or instructions for toning mapping the DFT output, and performing an inverse fast Fourier transform (IFFT) on the tone-mapped DFT output. In some examples of the method, apparatus, and non-transitory computer-readable medium described above, the identifying the payload sub-symbol tail portion and the inserting the copy of the identified payload sub-symbol tail portion may be performed after the performing the IFFT.

In some examples of the method, apparatus, and non-transitory computer-readable medium described above, the DFT and the IFFT may be performed using a first number of samples. In some examples of the method, apparatus, and non-transitory computer-readable medium described above, the DFT may be performed using a first number of samples, and the IFFT may be performed using a second number of samples that may be larger than the first number of samples.

In some examples of the method, apparatus, and non-transitory computer-readable medium described above, the sub-symbol cyclic prefix length may be identified as the first cyclic prefix length divided by a ratio of the second number of samples to the first number of samples. Some examples of the method, apparatus, and non-transitory computer-readable medium described above may further include processes, features, means, or instructions for repeating the identifying, formatting, and transmitting for a second full symbol, and wherein a number of sub-symbols of the first full symbol may be different than a number of sub-symbols of the second full symbol.

In some examples of the method, apparatus, and non-transitory computer-readable medium described above, the formatting may include formatting the pilot signal and the payload into a first sub-symbol and a second sub-symbol, where the first sub-symbol may be further formatted into sub-symbol sections that may be nested within the sub-symbol. In some examples of the method, apparatus, and non-transitory computer-readable medium described above, the second sub-symbol may include a wideband pilot signal, and the first sub-symbol may include one or more sub-symbol sections for transmission of a narrowband pilot signal and one or more sub-symbol sections for transmission of the payload. In some examples of the method, apparatus, and non-transitory computer-readable medium described above, the identified nested sub-symbols may include a first sub-symbol and a second sub-symbol, where the first sub-symbol further may include two or more sub-symbol sections that may be nested within the sub-symbol. In some examples of the method, apparatus, and non-transitory computer-readable medium described above, the second sub-symbol may include a wideband pilot signal, and the first sub-symbol may include one or more sub-symbol sections for transmission of a narrowband pilot signal and one or more sub-symbol sections for transmission of the payload.

In some examples of the method, apparatus, and non-transitory computer-readable medium described above, a tone spacing of each of the separate sub-symbols may be the same as a tone spacing of one or more other symbols that do not may have nested sub-symbols. In some examples of the method, apparatus, and non-transitory computer-readable medium described above, the first full symbol may be transmitted using a single-carrier waveform.

A method of wireless communication is described. The method may include receiving a first symbol in a wireless transmission from a transmitter, where the first symbol may have a first symbol cyclic prefix, identifying two or more nested sub-symbols within the first symbol, where the two or more nested sub-symbols may be formatted in the time domain into separate sub-symbols. In some cases, each nested sub-symbol may have an associated sub-symbol cyclic prefix, and demodulating and decoding the two or more nested sub-symbols may be based at least in part on the sub-symbol cyclic prefix associated with each sub-symbol.

An apparatus for wireless communication is described. The apparatus may include means for receiving a first symbol in a wireless transmission from a transmitter, where the first symbol may have a first symbol cyclic prefix, means for identifying two or more nested sub-symbols within the first symbol, where each nested sub-symbol may be formatted in the time domain into separate sub-symbols. In some cases, each nested sub-symbol may have an associated sub-symbol cyclic prefix, and means for demodulating and decoding the two or more nested sub-symbols may be based at least in part on the sub-symbol cyclic prefix associated with each sub-symbol.

Another apparatus for wireless communication is described. The apparatus may include a processor, memory in electronic communication with the processor, and instructions stored in the memory. The instructions may be operable to cause the processor to receive a first symbol in a wireless transmission from a transmitter, where the first symbol may have a first symbol cyclic prefix, identify two or more nested sub-symbols within the first symbol, where each nested sub-symbol may be formatted in the time domain into separate sub-symbols. In some cases, each nested sub-symbol may have an associated sub-symbol cyclic prefix, and the instructions may be operable to cause the processor to demodulate and decode the two or more nested sub-symbols based at least in part on the sub-symbol cyclic prefix associated with each sub-symbol.

A non-transitory computer readable medium for wireless communication is described. The non-transitory computer-readable medium may include instructions operable to cause a processor to receive a first symbol in a wireless transmission from a transmitter, where the first symbol may have a first symbol cyclic prefix, identify two or more nested sub-symbols within the first symbol, where each nested sub-symbol may be formatted in the time domain into separate sub-symbols. In some cases, each nested sub-symbol may have an associated sub-symbol cyclic prefix, and the non-transitory computer-readable medium may include instructions operable to cause a processor to demodulate and decode the two or more nested sub-symbols based at least in part on the sub-symbol cyclic prefix associated with each sub-symbol.

In some examples of the method, apparatus, and non-transitory computer-readable medium described above, the first symbol includes a first symbol cyclic prefix, each nested sub-symbol includes an associated sub-symbol cyclic prefix, and the demodulating and decoding the two or more nested sub-symbols may be based at least in part on the sub-symbol cyclic prefix associated with each sub-symbol. In some examples of the method, apparatus, and non-transitory computer-readable medium described above, the nested sub-symbols include a first sub-symbol that includes a pilot signal transmission and a second sub-symbol that includes a payload transmission. In some examples of the method, apparatus, and non-transitory computer-readable medium described above, the nested sub-symbols include one or more sub-symbols that include the pilot signal transmission and one or more sub-symbols that include the payload transmission.

In some examples of the method, apparatus, and non-transitory computer-readable medium described above, the nested sub-symbols include a first sub-symbol that includes a pilot signal transmission and a second sub-symbol that includes a payload transmission. In some examples of the method, apparatus, and non-transitory computer-readable medium described above, the sub-symbols include one or more sub-symbols that include the pilot signal and one or more sub-symbols that include the payload. In some examples of the method, apparatus, and non-transitory computer-readable medium described above, the payload may be data, control information, or any combination thereof.

In some examples of the method, apparatus, and non-transitory computer-readable medium described above, the first symbol cyclic prefix may have a first cyclic prefix length and each sub-symbol cyclic prefix may have a sub-symbol cyclic prefix length that corresponds to the first cyclic prefix length divided by a number of the separate sub-symbols. Some examples of the method, apparatus, and non-transitory computer-readable medium described above may further include processes, features, means, or instructions for repeating the receiving, identifying, and demodulating and decoding for a second symbol, and wherein a number of nested sub-symbols of the first symbol may be different than a number of nested sub-symbols of the second full symbol.

In some examples of the method, apparatus, and non-transitory computer-readable medium described above, a tone spacing of each of the separate sub-symbols may be the same as a tone spacing of one or more other symbols that do not may have nested sub-symbols. In some examples of the method, apparatus, and non-transitory computer-readable medium described above, the first symbol may be transmitted using a single-carrier waveform.

DETAILED DESCRIPTION

Figure 1:
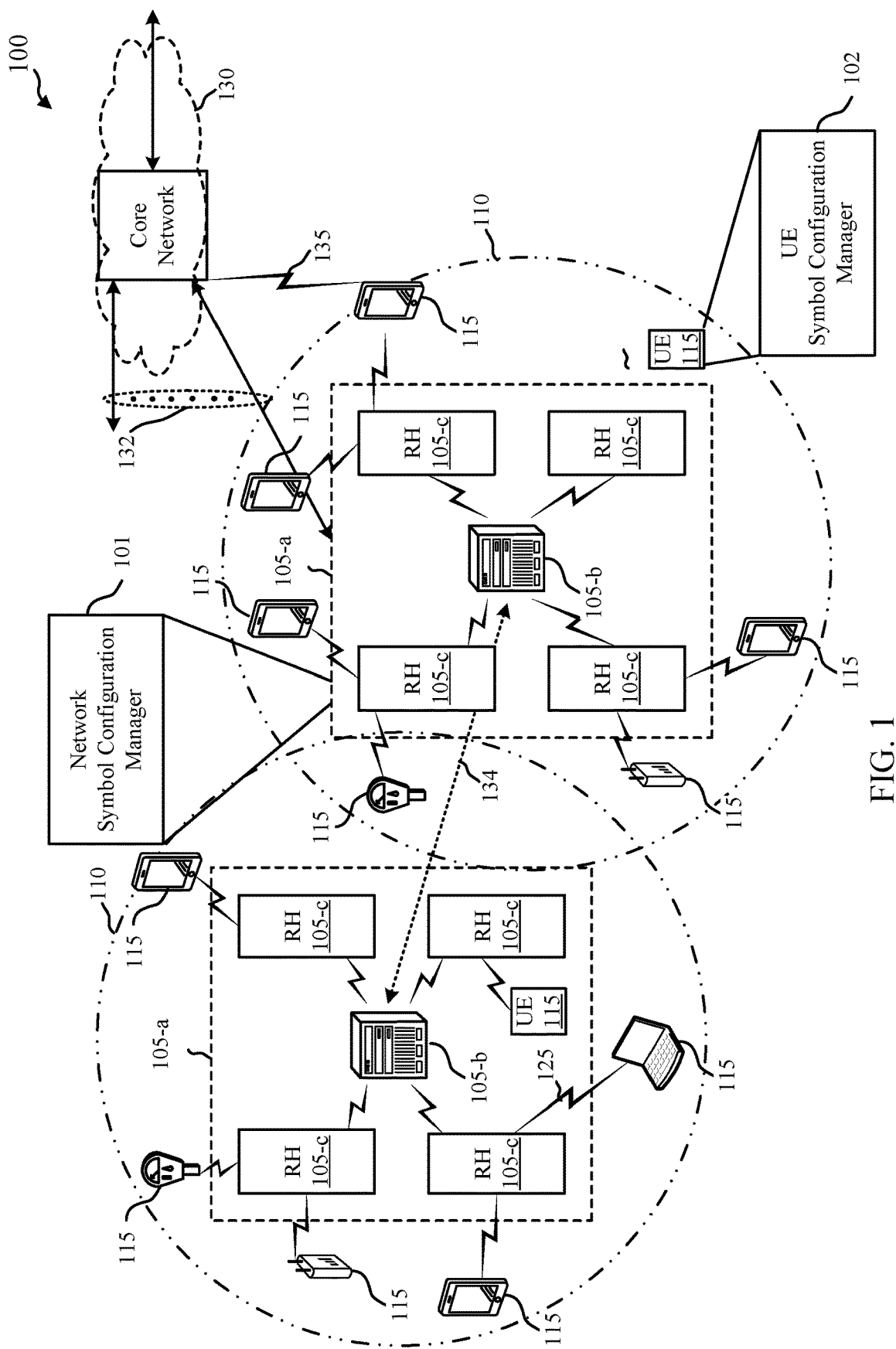
FIG. 1 illustrates an example of a wireless communications system that supports virtual symbol splitting techniques in wireless communications in accordance with one or more aspects of the present disclosure.

Techniques are described that provide for virtual symbol splitting for uplink and/or downlink wireless transmissions. In some aspects, a symbol may carry a pilot signal, where the pilot signal may occupy the entire symbol. Such pilot signals may allow a receiver to perform various functions, such as demodulation, channel condition estimation, interference mitigation, etc. However, such pilot signals add overhead, as they occupy wireless resources that could otherwise be used for data transmission. In order to reduce the overhead associated with pilot signals, some techniques may split a symbol into two half-symbols, with the pilot signal transmitted in one half-symbol and a payload transmitted in the other half-symbol. The payload may be, for example, data or control information. However, such splitting of symbols in time may result in frequency tone spacing being doubled through the conversion to the frequency domain, which may lead to increased channel frequency selectivity. Various techniques provided herein provide for virtual splitting of symbols into two or more sub-symbols that may have a same tone spacing as a non-split symbol. Such techniques may provide for enhanced pilot transmission with reduced signal fading as a result of the tone spacing remaining relatively smaller with respect to symbols that are split in time.

In some examples, a wireless transmitter, such as a UE or a base station, may identify a pilot signal and a payload to be transmitted in a full symbol. The transmitter may format the pilot signal and the payload in the time domain into separate sub-symbols that are nested within the first full symbol. In some cases, the sub-symbols may include an associated sub-symbol cyclic prefix, and the full symbol may include a full symbol cyclic prefix. The transmitter may then transmit the full symbol, including the nested sub-symbols, to a receiver. The receiver may then receive the full symbol and demodulate and decode the sub-symbols to obtain the pilot signal and the payload transmitted within the full symbol. Thus, overhead associated with pilot signals may be reduced through the transmission of both a pilot and a payload within a symbol. In some cases, a full symbol may be virtually split into more than two sub-symbols, which may be used to further reduce overhead associated with pilot transmissions.

In some cases, when formatting the sub-symbols, the wireless transmitter may identify a first cyclic prefix length for the full symbol cyclic prefix, and may identify a sub-symbol cyclic prefix length as the first cyclic prefix length divided by a number of the separate sub-symbols that are to be formatted. The pilot signal may be formatted to be in front of the payload to be transmitted, in the time domain, and a tail portion of the pilot signal having the sub-symbol cyclic prefix length may be identified as a payload sub-symbol cyclic prefix. The transmitter may append a copy of the payload sub-symbol cyclic prefix to the end of the payload in the payload sub-symbol, thereby creating a payload sub-symbol having a payload sub-symbol cyclic prefix with the associated sub-symbol cyclic prefix length. Signal processing (e.g., a DFT, tone mapping, and an IFFT) may be performed on the pilot signal and the payload sub-symbol. The transmitter may then identify a payload sub-symbol tail portion having the first cyclic prefix length, copy that portion of the tail and insert the copy in front of the pilot signal sub-symbol, to thereby create a pilot sub-symbol having the sub-symbol cyclic prefix and also create the full symbol having the associated full symbol cyclic prefix. Thus, the full symbol contains multiple nested sub-symbols, one or more of which may be used for pilot signal transmissions and one or more of which may be used for payload transmissions.

The present disclosure describes various techniques with reference to next generation networks (e.g., 5G or NR networks) that are being designed to support features such as high bandwidth operations, more dynamic subframe types, and self-contained subframe types (in which hybrid automatic repeat request (HARQ) feedback for a subframe may be transmitted before the end of the subframe). However, such techniques may be used for any system in which multi-carrier or single-carrier waveforms may be used for UL or DL transmissions, and where split symbols may help to improve network efficiency.

Aspects of the disclosure are initially described in the context of a wireless communications system. Aspects of the disclosure are further illustrated by and described with reference to diagrams, system diagrams, and flowcharts that relate to virtual symbol splitting in wireless communications.

FIG. 1 illustrates an example of a wireless communications system 100 that supports virtual symbol splitting techniques in wireless communications in accordance with one or more aspects of the present disclosure. The wireless communications system 100 may include network devices 105, UEs 115, and a core network 130. Wireless communications system 100 may support virtual split symbol transmissions as discussed hereon.

A core network 130 may provide user authentication, access authorization, tracking, Internet Protocol (IP) connectivity, and other access, routing, or mobility functions. At least some of the network devices 105 (e.g., network device 105-a, which may be an example of a LTE eNB, an eLTE eNB, an NR gNodeB (gNB), an NR Node-B, an NR access node, a base station, or a gNB; and network device 105-b, which may be an example of an ANC, or a centralized unit) may interface with the core network 130 through backhaul links 132 (e.g., S1, S2, NG-1, NG-2, NG-3, NG-C, NG-U etc.) and may perform radio configuration and scheduling for communication with the UEs 115. In various examples, the network devices 105-b may communicate, either directly or indirectly (e.g., through core network 130), with each other over backhaul links 134 (e.g., X1, X2, Xn etc.), which may be wired or wireless communication links. In some examples, a UE 115 may communicate with the core network 130 through communication link 135.

Each network device 105-b may also communicate with a number of UEs 115 through a number of other network devices 105-c, where network device 105-c may be an example of a transmission reception point (TRP), a distributed unit (DU), a RH, a remote radio head (RRH), or a smart radio head. In alternative configurations, various functions of each network device 105 may be distributed across various network devices 105 (e.g., radio heads/distributed units and access network controllers/centralized units) or consolidated into a single network device 105 (e.g., a base station/an access node).

The wireless communications system 100 may support synchronous or asynchronous operation. For synchronous operation, the network devices 105-a and/or network devices 105-c may have similar frame timing, and transmissions from different network devices 105-a and/or network devices 105-c may be approximately aligned in time. For asynchronous operation, the network devices 105-a and/or network devices 105-c may have different frame timings, and transmissions from different network devices 105-a and/or network devices 105-c may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or one of the layer 2 protocol stack (e.g. Packet Data Convergence Protocol (PDCP)) may be IP-based. One of the layer 2 protocol stack (e.g. PDCP, Radio Link Control (RLC) or Medium Access Control (MAC)) may in some cases perform packet segmentation and reassembly to communicate over logical channels. One of the layer 2 protocol stack (e.g. A MAC) may perform priority handling and multiplexing of logical channels into transport channels. The MAC layer may also use HARQ to provide retransmission at the MAC layer to improve link efficiency. In the control plane, the Radio Resource Control (RRC) protocol layer may provide establishment, configuration, and maintenance of an RRC connection between a UE 115 and a network device 105-c, network device 105-b, or core network 130 supporting radio bearers for user plane data. At the Physical (PHY) layer, transport channels may be mapped to physical channels.

The UEs 115 may be dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, a smart phone, a smart watch, a customer premises equipment (CPE) or the like. A UE may be able to communicate with various types of network devices 105-a, network devices 105-c, base stations, access points, or other network devices, including macro eNBs, small cell eNBs, gNBs, relay base stations, and the like. A UE may also be able to communicate directly with other UEs (e.g., using a peer-to-peer (P2P) protocol).

The communication links 125 and 135 shown in wireless communications system 100 may include UL channels from a UE 115 to a network device 105, and/or DL channels, from a network device 105 to a UE 115. The downlink channels may also be called forward link channels, while the uplink channels may also be called reverse link channels. Control information and data may be multiplexed on an uplink channel or downlink according to various techniques. Control information and data may be multiplexed on a downlink channel, for example, using time-division multiplexing (TDM) techniques, frequency-division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency-division duplexing (FDD) and time-division duplexing (TDD) component carriers. Wireless communications system 100 may also support multiple-input multiple-output (MIMO) operation in which multiple concurrent transmissions may share time and frequency resources, and may uniquely modulate a transmission stream with space-time orthogonal codes, such as spatial frequency block codes (SFBC). These spatial resources may be called transmission layers, and the same or different streams of data may be transmitted over different transmission layers. For single-user MIMO (SU-MIMO), multiple transmission layers may be transmitted to the same UE, while in multiple user (MU-MIMO), multiple transmission layers may be transmitted to different UEs. A capability reported by a UE 115 may take into account the radio frequency (RF) chains available at the UE 115 based on such multi-carrier or MIMO operation.

In some cases, wireless communications system 100 may utilize enhanced component carriers (eCCs). An eCC may be characterized by one or more features including: wider bandwidth, shorter symbol duration, and shorter TTIs. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or a network device 105, utilizing eCCs may transmit wide-band signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable. A 5G or NR carrier may be considered an eCC.

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length, and systems that use this region may be referred to as millimeter wave (mmWave) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

UL and DL transmissions may use one of a number of different waveforms, such as single-carrier waveforms (e.g., as single carrier-frequency division multiplexing (SC-FDM) waveforms, DFT-spread-orthogonal frequency division multiplexing (OFDM) (DFT-s-OFDM) waveforms, or CDMA waveforms) that use a single carrier for information transmission of a wireless channel, and multi-carrier waveforms (e.g., OFDM waveforms) that use multiple carriers at different frequencies to transmit some of the bits on each channel. DFT-s-OFDM provides a transmission scheme similar to OFDM, but with a DFT precoding stage applied before the IFFT at the transmitter, resulting in a single-carrier signal with significantly lower peak-to-average power ratio (PAPR) than OFDM. It is also known as Single Carrier-Frequency Division Multiplexing (SC-FDM). In some examples, the UL waveform for use by a UE 115 may be selected based on one or more factors, such as power amplifier (PA) efficiency, battery life, demodulation performance, and the like. Single-carrier waveforms (e.g., DFT-s-OFDM waveforms) that provide a lower PAPR than a multicarrier waveform, which may provide good PA efficiency at a UE 115 and thereby enable relatively good cell coverage with efficient power utilization that may be beneficial for a battery-powered UE 115, and are commonly used for UL transmissions from a UE 115.

In the example of FIG. 1, network device 105-a (e.g., a base station) may include a network symbol configuration manager 101, which may identify a pilot signal and a payload to be transmitted in a full symbol, and format the pilot signal and the payload in the time domain into separate sub-symbols that are nested within the full symbol. In some cases, each sub-symbol may include an associated sub-symbol cyclic prefix, and the full symbol may include a full symbol cyclic prefix. The network symbol configuration manager 101 may then coordinate the transmission of the full symbol, including the nested sub-symbols, to a UE 115. In some examples, network device 105-a may receive a symbol with nested sub-symbols, and the network symbol configuration manager 101 may identify two or more nested sub-symbols within the symbol, where each nested sub-symbol may have an associated sub-symbol cyclic prefix, and demodulate and decode each sub-symbol to obtain information from each (e.g., a pilot signal and a payload) transmitted within the full symbol. The network symbol configuration manager 101 may be an example of a base station communications manager 1315 as described with reference to FIG. 13.

UEs 115 may include a UE symbol configuration manager 102, which may identify a pilot signal and a payload to be transmitted in a full symbol, and format the pilot signal and the payload in the time domain into separate sub-symbols that are nested within the full symbol. In some cases, each sub-symbol may include an associated sub-symbol cyclic prefix, and the full symbol may include a full symbol cyclic prefix. The UE symbol configuration manager 102 may then coordinate the transmission of the full symbol, including the nested sub-symbols, to a network device 105. In some examples, UE 115 may receive a symbol with nested sub-symbols in a transmission from a network device 105, and the UE symbol configuration manager 102 may identify two or more nested sub-symbols within the symbol, where each nested sub-symbol may have an associated sub-symbol cyclic prefix, and demodulate and decode each sub-symbol to obtain information from each (e.g., a pilot signal and a payload) transmitted within the full symbol. The UE symbol configuration manager 102 may be an example of a UE communications manager 1215 as described with reference to FIG. 12.

Figure 2:
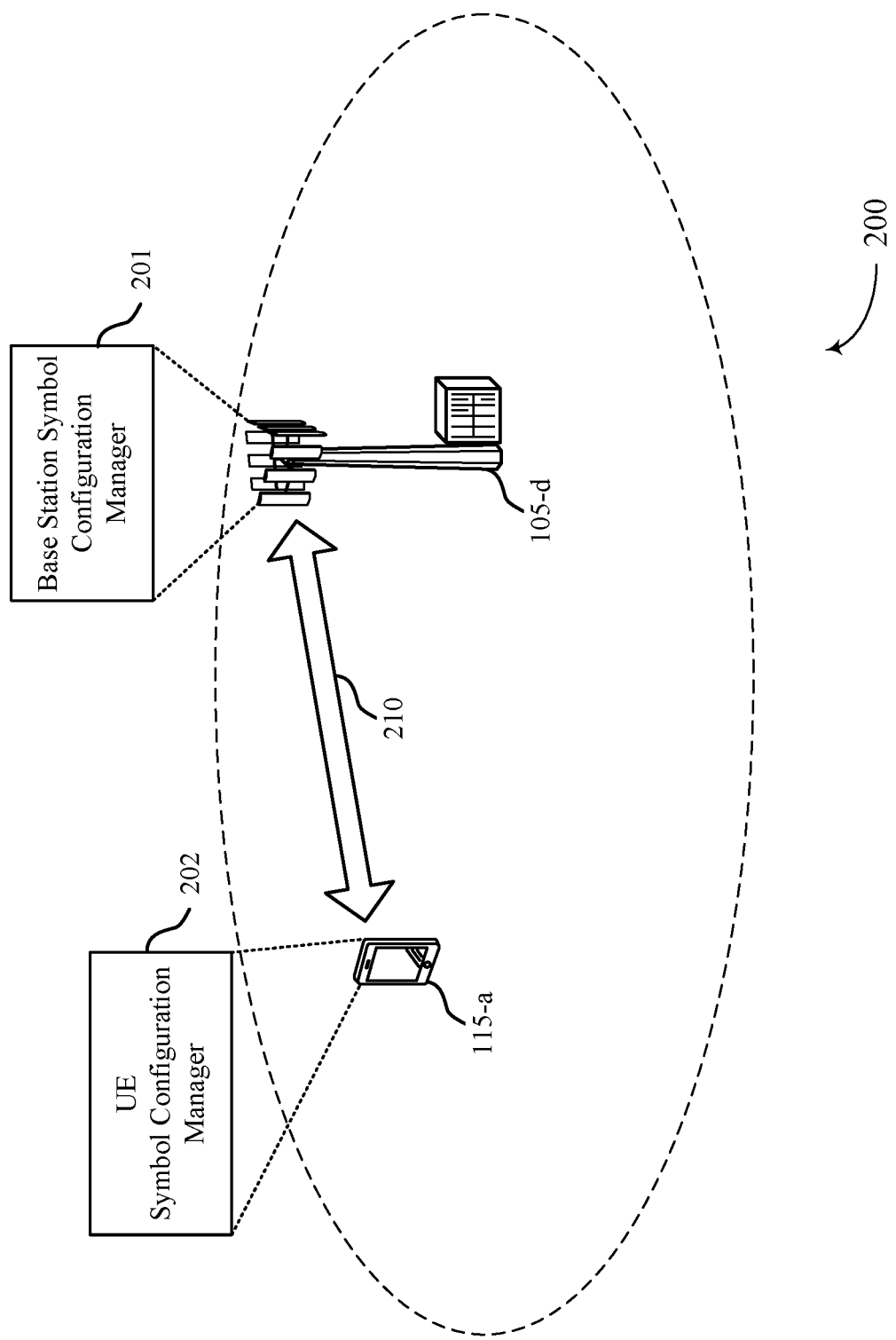
FIG. 2 illustrates an example of a portion of a wireless communications system that supports virtual symbol splitting techniques in wireless communications in accordance with one or more aspects of the present disclosure.

FIG. 2 illustrates an example of a portion of a wireless communications system 200 that supports virtual symbol splitting techniques in wireless communications in accordance with one or more aspects of the present disclosure. Wireless communications system 200 may include base station 105-d and UE 115-a, which may be examples of the corresponding devices as described with reference to FIG. 1. In the example of FIG. 2, the base station 105-d and UE 115-a may establish a connection 210 in which split symbols may be used in communications. In the example of FIG. 2, the wireless communications system may operate according to a first radio access technology (RAT), such as a 5G or NR RAT, although techniques described herein may be applied to any RAT and to systems that may benefit from reduced overhead associated with pilot transmissions.

In some examples, the first base station 105-d may include a base station symbol configuration manager 201, which may be an example of network symbol configuration manager 101 as described with reference to FIG. 1, and may be used to receive and/or transmit virtually split symbols in which two or more sub-symbols are nested within a full symbol from/to the UE 115-a. The base station symbol configuration manager 201 may determine wireless resources associated with the connection 210, and whether symbols transmitted using the connection 210 contain nested sub-symbols. The base station 105-d may provide an indication of symbol splitting or an indication that one or more symbols contain nested sub-symbols to the UE 115-a for use in transmitting or receiving wireless transmissions over the first connection 210. In some cases, a single-carrier waveform (e.g., a DFT-s-OFDM waveform) may be selected for UL transmissions of the first connection 210, and a multi-carrier waveform (e.g., an OFDM waveform) may be selected for DL transmissions of the first connection 210. In some examples, however, DL transmissions may use a single-carrier waveform and UL transmissions may use a multi-carrier waveform, or combinations of waveforms may be used for UL and DL transmissions. The base station symbol configuration manager 201 may be an example of a base station communications manager 1315 as described with reference to FIG. 13.

The UE 115-a may include a UE symbol configuration manager 202, which may be an example of UE symbol configuration manager 102 as described with reference to FIG. 1, and which may be used to transmit and/or receive virtually split symbols in which two or more sub-symbols are nested within a full symbol to/from the base station 105-d. The UE symbol configuration manager 202 may be an example of a UE communications manager 1215 as described with reference to FIG. 12.

As indicated above, in some examples the wireless communications system 200 may be a portion of a NR or 5G network. Based on growing demand for data and throughput anticipated for 5G, efficiency in the use of wireless resources may help to enhanced data throughput. One technique for enhancing network efficiency is to reduce the overhead associated with pilot signals, and other non-user-data transmissions. As indicated above, in cases where a pilot is to be transmitted using a single-carrier waveform, the pilot may have a granularity of full single-carrier symbol (e.g., the pilot may occupy an entire SC-FDM symbol). In some deployments, a subframe may include two slots, and each slot may have seven symbols. Thus, if one of the seven symbols contains a pilot signal, the associated pilot overhead is 14%. In some cases, the symbols may be split in the time-domain, thus creating 14 symbols in a slot and thereby reducing the pilot overhead in such a case to 7%. Such a physically split symbol may lead to shorter symbol duration but larger tone space after conversion to the frequency domain. Such larger tone spacing may make signal transmission more sensitive to channel frequency selectivity, as there may be more fading in the larger frequency band of the larger tone. One or more aspects of the present disclosure provide for virtually split symbols that may have two or more nested sub-symbols within a full symbol, and one (or more) of the sub-symbols may be used to transmit the pilot signal. In such a manner, overhead associated with pilot signals may be reduced, and the tone spacing of the full symbol may remain the same as tone spacing of other full symbols, which may enhance the transmission and reception of the information in the associated transmissions. In some cases, when formatting the pilot signal and the payload (e.g., data and control information) in the time domain into separate sub-symbols that are nested within the full symbol, each sub-symbol may include an associated sub-symbol cyclic prefix, and the full symbol may include a full symbol cyclic prefix.

Figure 3:
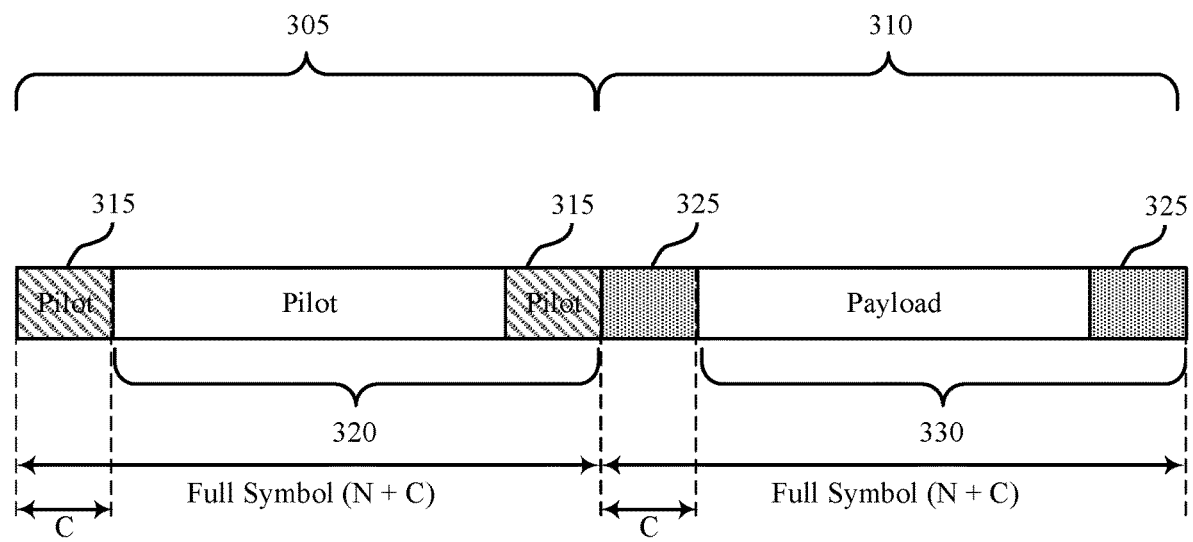
FIG. 3 illustrates an example of a pilot symbol and a payload symbol that support virtual symbol splitting techniques in wireless communications in accordance with one or more aspects of the present disclosure.

FIG. 3 illustrates an example 300 of a pilot symbol 305 and a payload symbol 310 that support virtual symbol splitting techniques in wireless communications in accordance with one or more aspects of the present disclosure. Pilot symbol 305 and payload symbol 310 may be symbols that are transmitted between UEs 115 and base stations 105 as described with respect to FIGS. 1-2. In this example, full symbols may be transmitted, in which each symbol has a cyclic prefix (CP) length of C, a symbol length excluding the CP of N, and a full symbol length including the CP of N+C, as indicated in FIG. 3.

The pilot symbol 305 may include a pilot symbol CP 315 and the pilot signal 320. The pilot symbol CP 315 is located at the head of the pilot symbol 305 and may include bits that correspond with bits at the tail portion of the pilot symbol 305 that occupy a length C at the tail portion. Similarly, the payload symbol 310 may include a payload symbol CP 325 and payload 330. The payload symbol CP 325 is located at the start of the payload symbol 310 and includes bits that correspond with bits at the tail portion of the payload symbol 310 that occupy a length C at the tail portion. As indicated above, various techniques are provided in which one or both of the pilot symbol 305 or payload symbol 310 may be configured to include two or more nested sub-symbols. As can be observed from the example 300, each symbol includes a CP having a length C and that has bits that correspond to bits located at the tail of the symbol. Thus, a virtually split symbol should have the same property, in which the full symbol has a CP of length C, and in which each sub-symbol also has an associated CP. In some examples, a full symbol may be provided that has multiple nested sub-symbols, and which achieve associated CPs through processing that is performed at different stages of symbol processing at a transmitter. In some examples, a subset of processing operations may be included before a DFT is performed on information for transmission, and following DFT and IFFT, another subset of processing operations may be performed.

Figure 4:
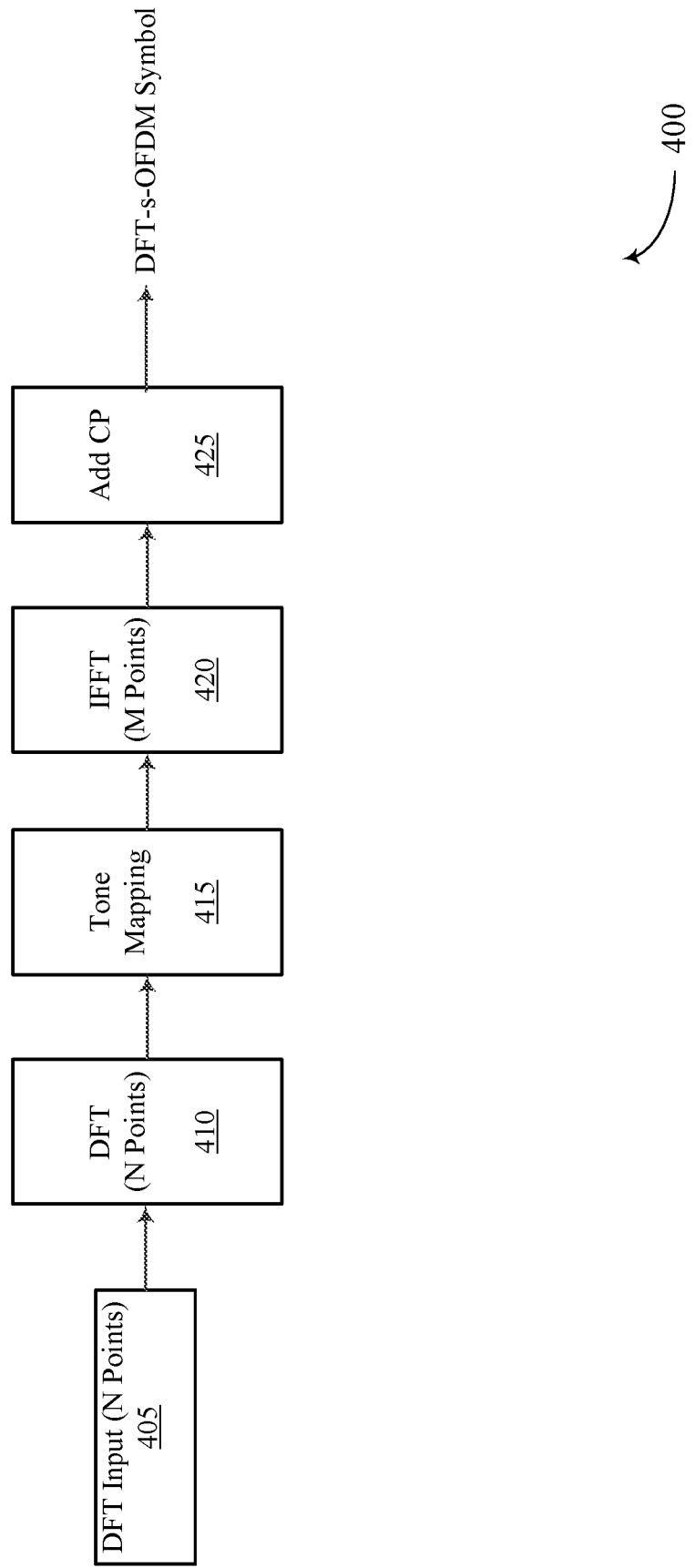
FIG. 4 illustrates an example of processing features that support virtual symbol splitting techniques in wireless communications in accordance with one or more aspects of the present disclosure.

FIG. 4 illustrates an example of processing features 400 that support virtual symbol splitting techniques in wireless communications in accordance with one or more aspects of the present disclosure. The processing features 400 may be included as a portion of a UE 115 and/or base stations 105 as described with respect to FIGS. 1-2. As indicated above, in some examples virtual symbol splitting operations may be performed at different stages of processing of a symbol for transmission. In the example of FIG. 4, a portion of such processing features 400 may receive N points of DFT input 405, which may correspond to a pilot signal and a payload that is to be transmitted in different sub-symbols of a full symbol. At 410, DFT processing may be performed on the input according to N samples associated with the N input points. At 415, tone mapping may be performed on the DFT output, followed by an IFFT at 420. In some cases, IFFT may be performed using M samples. In some cases, M may be the same as N, and in other cases M may be greater than N. In each case, symbol splitting and associated CP generation may be performed somewhat differently, as will be discussed in more detail below. Following the IFFT, a CP of length C may be added at 425 to provide the DFT-S-OFDM symbol output having M+C points, that may then be transmitted to a receiver. In some examples, a portion of the symbol splitting techniques may be performed prior to 410, and another portion may be performed after 420.

Figure 5A:
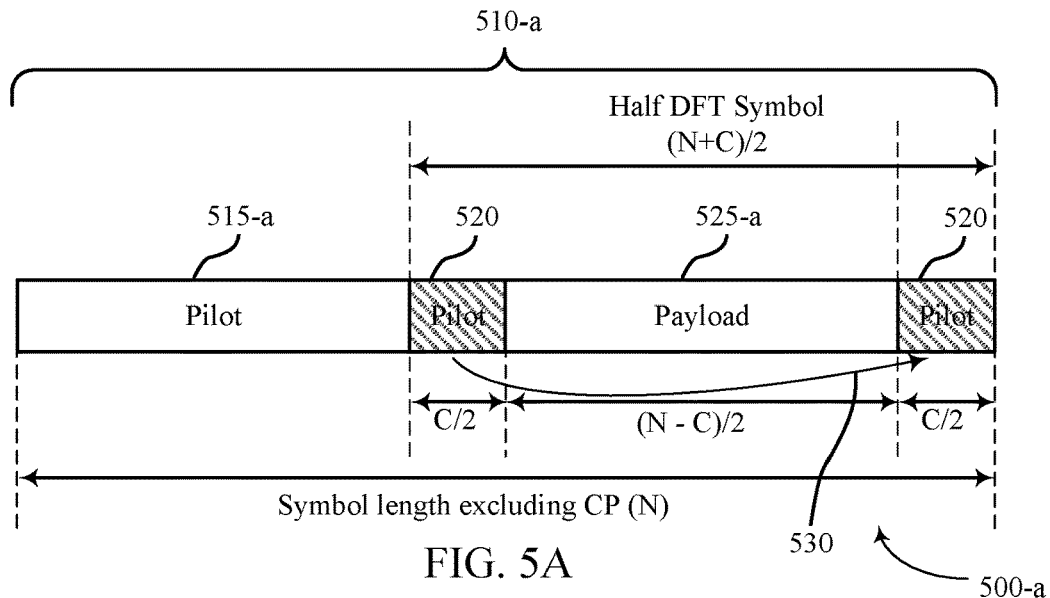
FIGS. 5A-5C illustrate examples of a first portion of a virtual symbol splitting technique in wireless communications in accordance with one or more aspects of the present disclosure.
Figure 5B:
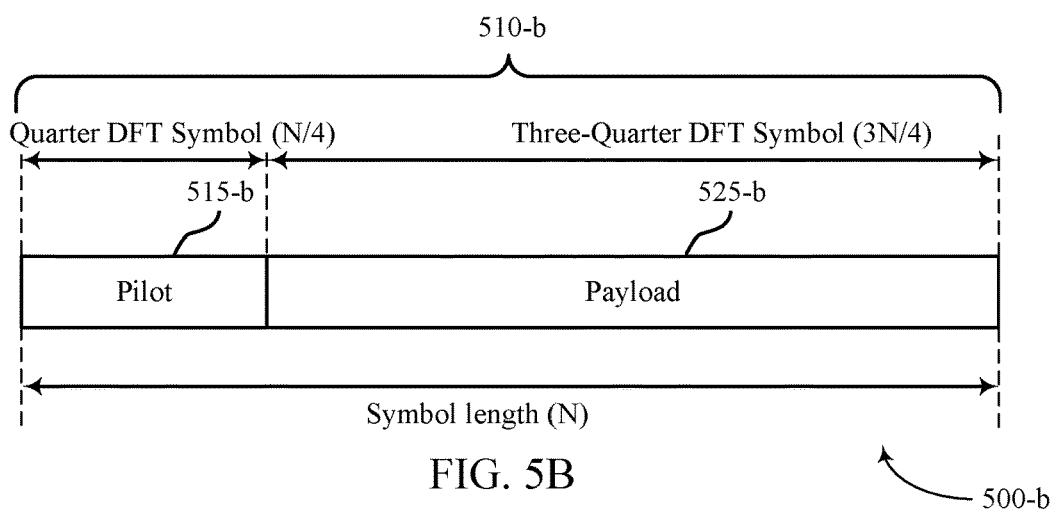
Figure 5C:
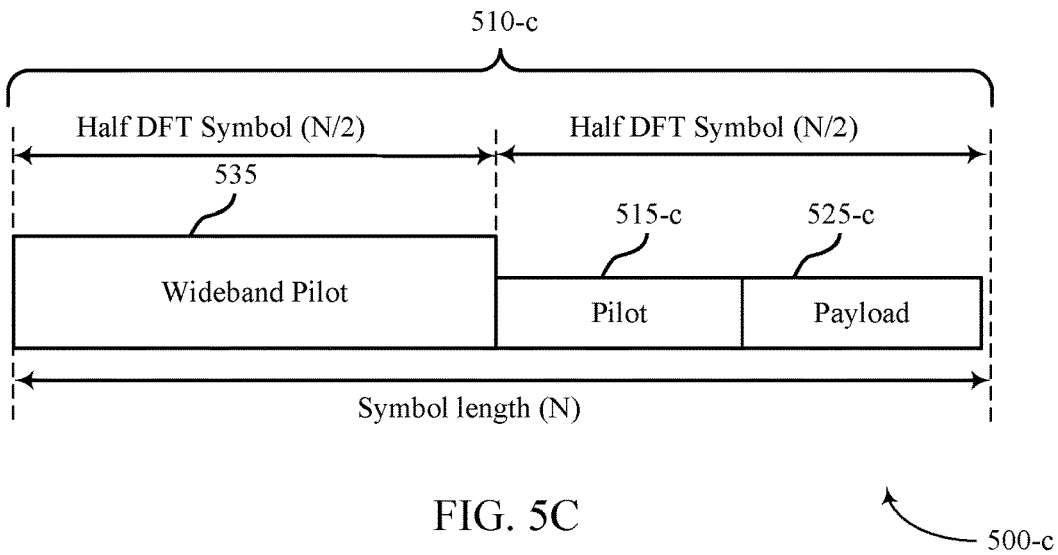

FIGS. 5A-5C illustrates examples 500 of a first portion of a virtual symbol splitting technique in wireless communications in accordance with one or more aspects of the present disclosure. In some cases, aspects of FIGS. 5A-5C may be performed before the DFT processing as discussed with reference to FIG. 4. Such virtual symbol splitting may be performed by a UE 115 and/or base stations 105 as described with respect to FIGS. 1-2.

FIG. 5A illustrates a first example 500-a of a first portion of a virtual symbol splitting technique in wireless communications in accordance with one or more aspects of the present disclosure. Input data 510-a may include pilot portion 515-a and payload portion 525-a. In this example, pilot portion 515-a and payload portion 525-a are shown to each have a half symbol length, but may additionally or alternatively be defined by any respective ratio of the pilot portion 515 to the payload portion 525. A subset of bits 520 of the pilot portion having a length of C/2, where C is the CP length of a full symbol, may be identified and copied over to be appended to the end of the payload portion, as indicated by arrow 530. This subset of bits 520 corresponds to the CP of the payload sub-symbol. Payload portion 525-a in this example may have a length of (N−C)/2, and may be bounded by the subsets of bits 520 to provide a payload sub-symbol having a length corresponding to half of the DFT symbol, corresponding to (N+C)/2, and thus a symbol length excluding the full symbol CP of N. Following the first portion of symbol splitting, DFT, tone mapping, and IFFT operations may be performed, for example as discussed with reference to FIG. 4.

FIG. 5B illustrates a second example 500-b of a first portion of a virtual symbol splitting technique in wireless communications in accordance with one or more aspects of the present disclosure. Input data 510-b may include pilot portion 515-b and payload portion 525-b. In this example, pilot portion 515-b and payload portion 525-b are shown to have respective lengths of a quarter symbol for pilot portion 515-b and a three-quarter symbol for payload portion 525-b, but may additionally or alternatively be defined by any respective ratio of the pilot portion 515 to the payload portion 525. In this example, input data 510-b may not include any bits for an additional CP. That is, in different cases, virtually split sub-symbols of different virtual symbol splitting techniques may include or exclude bits for an additional CP. In some cases, pilot portion 515-b may be used for a demodulation reference signal (DMRS). Following the first portion of symbol splitting, DFT, tone mapping, and IFFT operations may be performed, for example as discussed with reference to FIG. 4.

FIG. 5C illustrates a third example 500-c of a first portion of a virtual symbol splitting technique in wireless communications in accordance with one or more aspects of the present disclosure. Input data 510-c may include two physically split symbols. That is, input data 510-c may be split in the time domain, which may result in two physically split symbols, each having a shorter symbol durations, but large tone space. In this example, the physically split symbols are shown to each be half-symbols, but may in some cases have other lengths. One of the physically split symbols (shown here as the second half-symbol) may then be virtually split according to the techniques described herein to provide two nested sub-symbols (e.g., sub-symbol sections), pilot portion 515-c and payload portion 525-c within the physically split symbol. In some cases, pilot portion 515-c may be used for a narrowband pilot signal, whereas the other physically split wideband pilot portion 535 may be used for a wideband pilot signal.

In this example, pilot portion 515-c and payload portion 525-c are shown to have respective lengths of a quarter symbol for pilot portion 515-c and a quarter symbol for payload portion 525-b, but may additionally or alternatively be defined by any respective ratio of the pilot portion 515 to the payload portion 525. In this example, input data 510-c may not include any bits for an additional CP. In some cases, pilot portion 515-c may be used for a narrowband DMRS, and wideband pilot portion 535 may be used for a sounding reference signal (SRS). Following the first portion of symbol splitting, DFT, tone mapping, and IFFT operations may be performed, for example as discussed with reference to FIG. 4.

Figure 6:
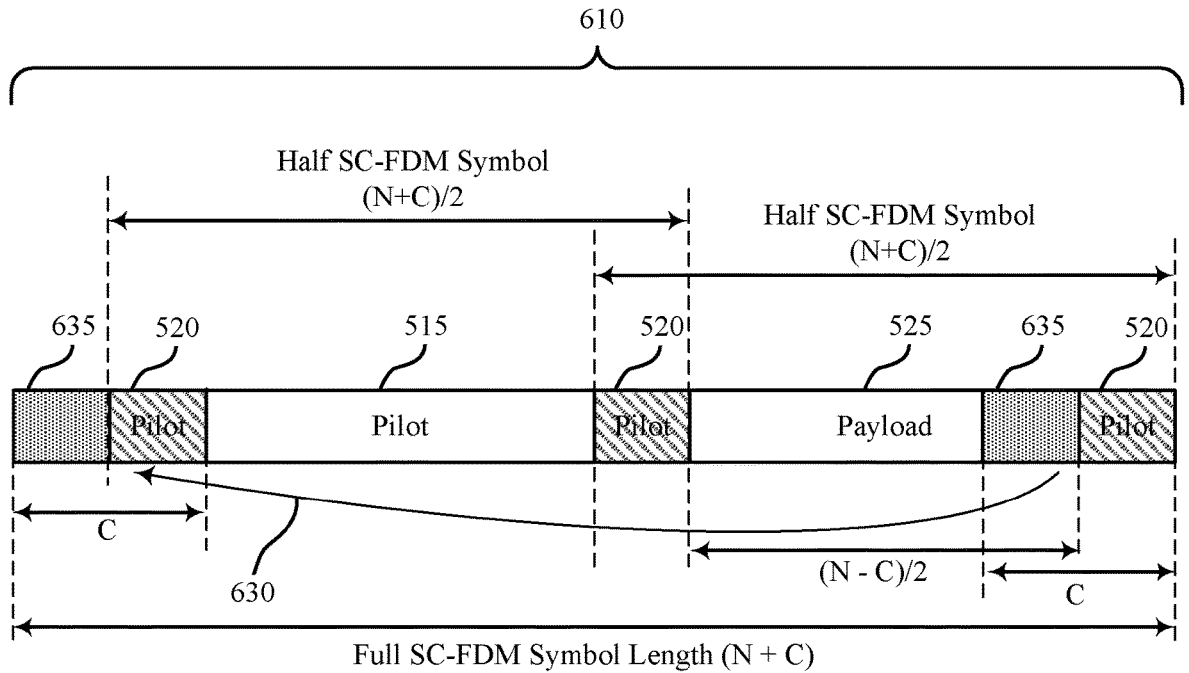
FIG. 6 illustrates an example of a second portion of a virtual symbol splitting technique in wireless communications in accordance with one or more aspects of the present disclosure.

FIG. 6 illustrates an example 600 of a second portion of a virtual symbol splitting technique in wireless communications in accordance with one or more aspects of the present disclosure. In some cases, aspects of FIG. 6 may be performed after the IFFT processing and as part of the CP addition as discussed above with reference to FIG. 4. Such virtual symbol splitting may be performed by a UE 115 and/or base stations 105 as described with respect to FIGS. 1-2.

In this example, as indicated above, IFFT processing has been performed, and a CP is to be added to the IFFT output to generate the DFT-s-OFDM symbol. The CP may be identified as the subset of bits 520 plus a payload portion 635 of the payload portion 525 having a length corresponding to C/2 at the tail of the payload portion 525. Thus, a tail portion of the payload sub-symbol having the cyclic prefix length C is identified, and is copied to the head of the pilot portion 515 as indicated by arrow 630. This copying thus generates the CP for the full SC-FDM symbol 610 (i.e., the DFT-s-OFDM symbol as described with reference to FIG. 4) having a length of N+C. Through the techniques discussed above, the full SC-FDM symbol 610 includes two half SC-FDM symbols (also referred to as sub-symbols) each having a length of (N+C)/2 that each have an associated CP of length C/2 and that are nested within the full SC-FDM symbol 610. In this example, one sub-symbol may include pilot portion 515, and the other sub-symbol may include payload portion 525. While the example of FIGS. 5 and 6 have the same number of DFT and IFFT points (i.e., N=M), the technique may be generalized to cases where IFFT has more points than the DFT, as described with reference to FIGS. 7-8.

Figure 7:
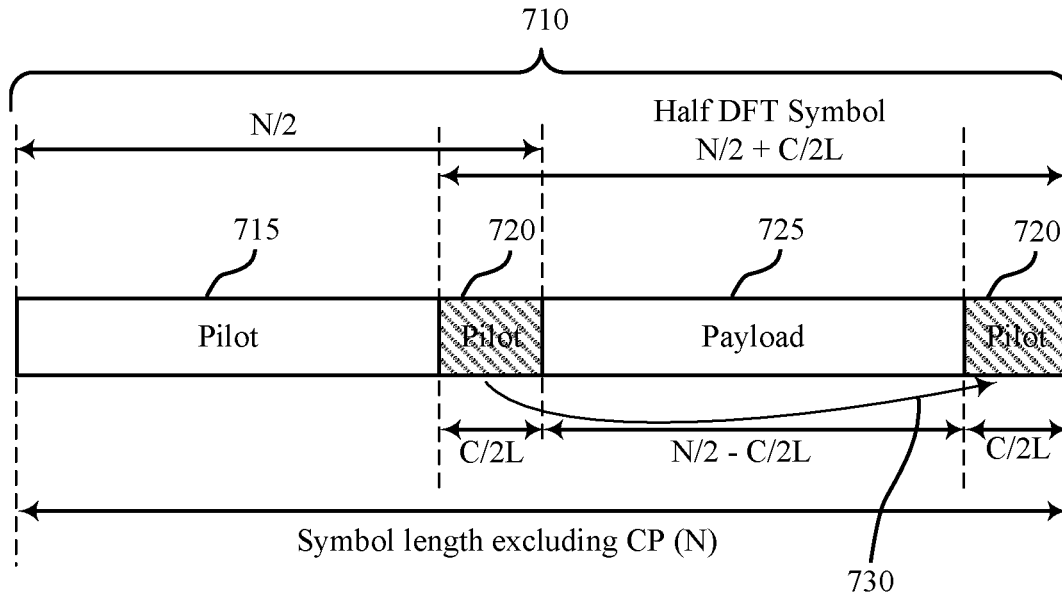
FIG. 7 illustrates an example of a first portion of a virtual symbol splitting technique in wireless communications in accordance with one or more aspects of the present disclosure.
Figure 8:
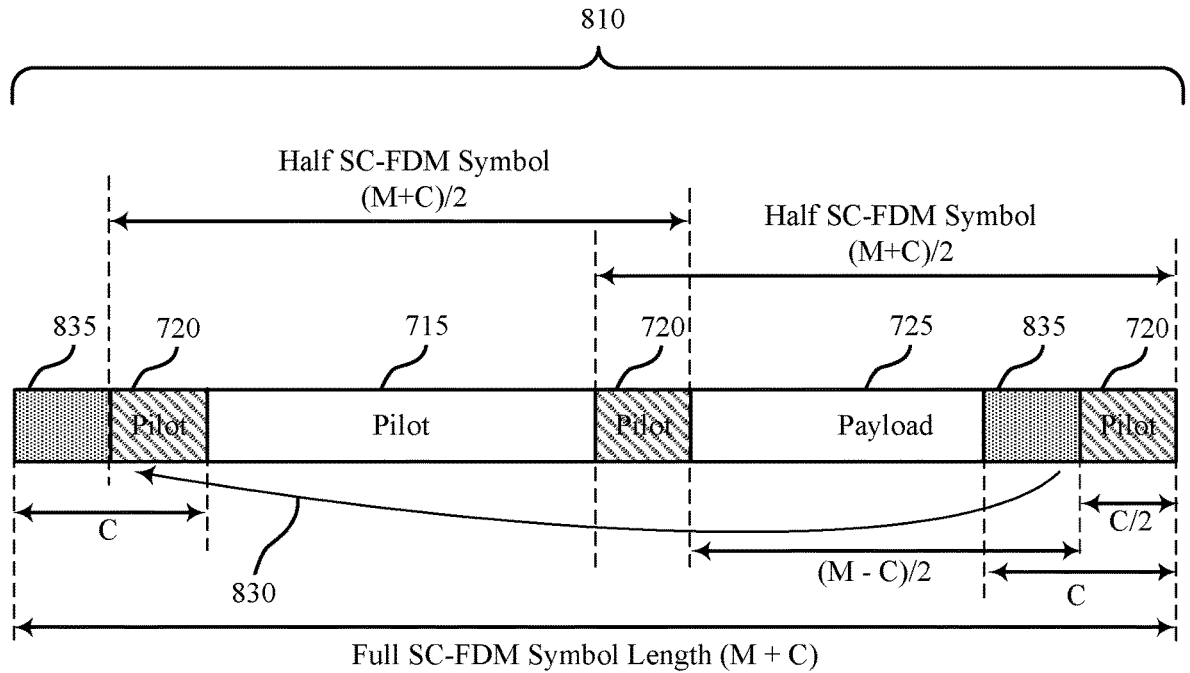
FIG. 8 illustrates an example of a second portion of a virtual symbol splitting technique in wireless communications in accordance with one or more aspects of the present disclosure.

FIG. 7 illustrates an example 700 of a first portion of a virtual symbol splitting technique in wireless communications in accordance with one or more aspects of the present disclosure, and FIG. 8 illustrates an example 800 of a second portion of virtual symbol splitting technique in wireless communications in accordance with one or more aspects of the present disclosure. In FIGS. 7 and 8, the IFFT points may be greater than the DFT points. Similarly as described with respect to FIGS. 5-6, aspects of FIG. 7 may be performed before DFT processing, and aspects of FIG. 8 may be performed after the IFFT processing and as part of the CP addition as described with respect to FIG. 4. Such virtual symbol splitting may be performed by a UE 115 and/or base stations 105 as described with respect to FIGS. 1-2.

As indicated, in this example, the number of IFFT points M may be greater than or equal to the number of DFT points N. A ratio, L, may be defined in which L=M/N, and the CP length of FIG. 7 may be scaled to be C/L. Following such a scaling of the CP length, and the associated scaling of the other portions that are determined based on the CP length, the remaining aspects of FIGS. 7 and 8 are the same as those described with reference to FIGS. 5 and 6, respectively. This can be observed with reference to FIGS. 7-8 in which the reference numerals correspond to the reference numerals in FIGS. 5-6 with an updated first digit.

While the examples of FIGS. 5-8 disclose splitting a full symbol into two sub-symbols, other examples may provide that a full symbol may be split into more than two symbols. In such examples, the CP length of for the sub-symbols may be adjusted according to the number of sub-symbols that are to be transmitted, with the remaining numbers adjusted accordingly such that one full symbol may be split into 2, 4, 8, . . . , $2^k$ sub-symbols. Additionally, the number of sub-symbols selected for a full symbol may vary over different symbols, across subframes or within a same subframe. For example, in one subframe, a first full symbol may be virtually split it into two half-symbols, with the first virtual half symbol assigned to pilots and the second virtual half symbol assigned to a payload, resulting in a 50% pilot overhead at the full symbol. Another full symbol, may then be virtually split into four quarter-symbols, with a first quarter symbol assigned to pilots and the remaining three quarter symbols assigned to a payload, resulting in a pilot overhead of 25% for the full symbol.

Figure 9:
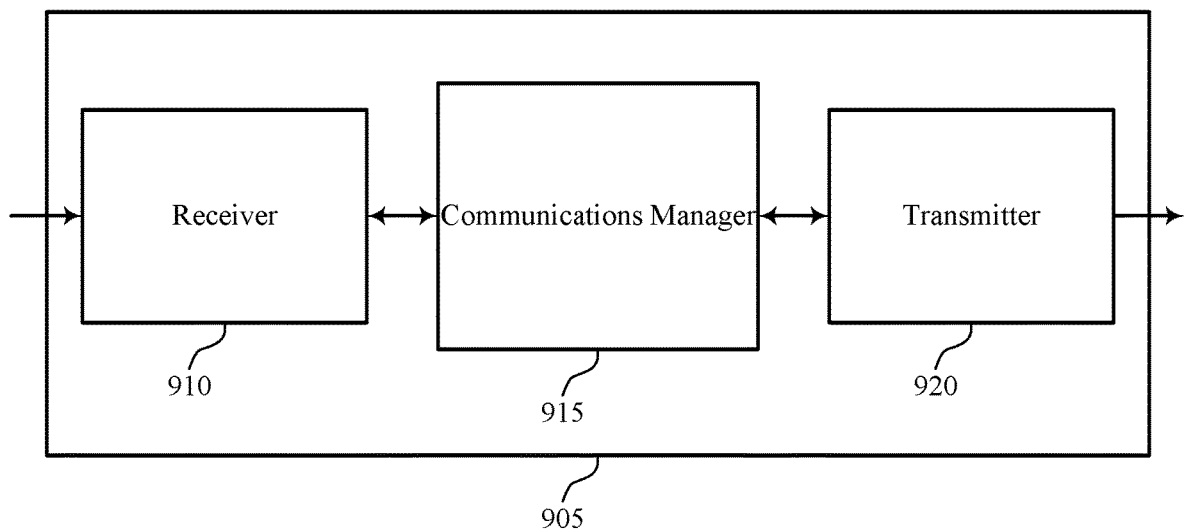
FIGS. 9 through 11 show diagrams of a device that supports virtual symbol splitting techniques in wireless communications in accordance with one or more aspects of the present disclosure.

FIG. 9 shows a diagram 900 of a device 905 that supports virtual symbol splitting techniques in wireless communications in accordance with one or more aspects of the present disclosure. Device 905 may be an example of aspects of a UE 115 or base station 105 as described with reference to FIGS. 1-2. Device 905 may include receiver 910, communications manager 915, and transmitter 920. Device 905 may also include a processor. Each of these components may be in communication with one another (e.g., via one or more buses).

Receiver 910 may receive information such as packets, user data, or control information associated with various information channels (e.g., control channels, data channels, and information related to virtual symbol splitting techniques in wireless communications, etc.). Information may be passed on to other components of the device. Receiver 910 may be an example of aspects of the transceiver 1235 as described with reference to FIG. 12 or transceiver 1335 as described with reference to FIG. 13.

Receiver 910 may receive signals and provide received signals to other components of the device. In some cases, the receiver 910 may receive a symbol that has two or more nested sub-symbols in a wireless transmission from a transmitter according to various aspects of this disclosure.

Communications manager 915 may be an example of aspects of the UE communications manager 1215 as described with reference to FIG. 12, or base station communications manager 1315 as described with reference to FIG. 13. Communications manager 915, when transmitting nested sub-symbols within a full symbol, may identify a pilot signal and a payload to be transmitted in a first full symbol, where the first full symbol may include a first symbol cyclic prefix, and format the pilot signal and the payload in the time domain into separate sub-symbols that are nested within the first full symbol. In some cases, the sub-symbols may include an associated sub-symbol cyclic prefix. The communications manager 915, when receiving nested symbols within a full symbol, may identify two or more nested sub-symbols within a first received symbol and demodulate and decode the two or more nested sub-symbols. In some cases, the nested sub-symbol may have an associated sub-symbol cyclic prefix, and the nested sub-symbols may be demodulated and decoded based on the sub-symbol cyclic prefix associated with each sub-symbol.

Transmitter 920 may transmit signals generated by other components of the device. In some examples, the transmitter 920 may be collocated with a receiver 910 in a transceiver module. For example, the transmitter 920 may be an example of aspects of the transceiver 1235 as described with reference to FIG. 12 or transceiver 1335 as described with reference to FIG. 13. The transmitter 920 may include a single antenna, or it may include a set of antennas. Transmitter 920 may transmit the a full symbol, including two or more nested sub-symbols, to a receiver.

Figure 10:
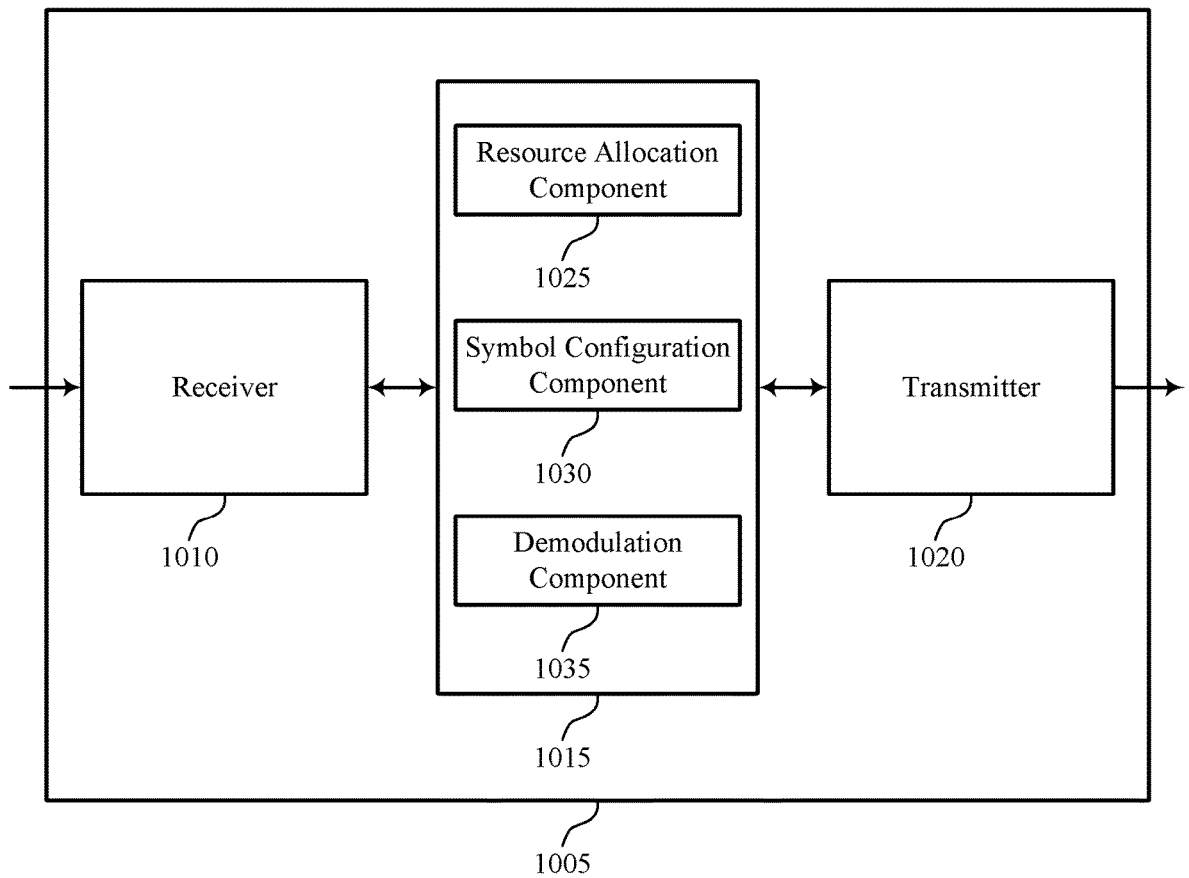

FIG. 10 shows a diagram 1000 of a device 1005 that supports virtual symbol splitting techniques in wireless communications in accordance with one or more aspects of the present disclosure. Device 1005 may be an example of aspects of a device 905 or a UE 115 or base station 105 as described with reference to FIGS. 1, 2, and 9. Device 1005 may include receiver 1010, communications manager 1015, and transmitter 1020. Device 1005 may also include a processor. Each of these components may be in communication with one another (e.g., via one or more buses).

Receiver 1010 may receive information such as packets, user data, or control information associated with various information channels (e.g., control channels, data channels, and information related to virtual symbol splitting techniques in wireless communications, etc.). Information may be passed on to other components of the device. The receiver 1010 may be an example of aspects of the transceiver 1235 as described with reference to FIG. 12 or transceiver 1335 as described with reference to FIG. 13. Communications manager 1015 may be an example of aspects of the UE communications manager 1215 as described with reference to FIG. 12 or base station communications manager 1315 as described with reference to FIG. 13. Communications manager 1015 may also include resource allocation component 1025, symbol configuration component 1030, and demodulation component 1035.

Resource allocation component 1025 may identify a pilot signal and data to be transmitted in a first full symbol, where the first full symbol may include a first symbol cyclic prefix. In some examples, resource allocation component 1025 may identify a pilot signal and a payload to be transmitted in a second full symbol, and a number of sub-symbols of the first full symbol may be different than a number of sub-symbols of the second full symbol. In some cases, a full symbol may be transmitted using a single-carrier waveform.

Symbol configuration component 1030, when transmitting virtually split symbols, may format the pilot signal and the payload in the time domain into separate sub-symbols that are nested within the first full symbol. In some cases, the sub-symbols may include an associated sub-symbol cyclic prefix. For example, symbol configuration component 1030 may format the pilot signal in front of the payload to be transmitted, append a copy of the payload sub-symbol cyclic prefix to the end of the payload in the payload sub-symbol, insert a copy of the identified payload sub-symbol tail portion in front of the pilot signal sub-symbol. Symbol configuration component 1030, when receiving virtually split symbols, may identify two or more nested sub-symbols within a first symbol, each nested sub-symbol having an associated sub-symbol cyclic prefix. In some cases, the sub-symbols include a first sub-symbol for transmission of the pilot signal and a second sub-symbol for transmission of the payload. In some cases, the sub-symbols include one or more sub-symbols for transmission of the pilot signal and one or more sub-symbols for transmission of the payload. In some cases, the identifying the payload sub-symbol tail portion and the inserting the copy of the identified payload sub-symbol tail portion are performed after the performing an IFFT.

Demodulation component 1035, when receiving virtually split symbols, may demodulate and decode the two or more nested sub-symbols based on the sub-symbol cyclic prefix associated with each sub-symbol. In some cases, multiple full symbols may be received that include different numbers of sub-symbols, where a number of nested sub-symbols of the first symbol is different than a number of nested sub-symbols of a second full symbol. In some cases, symbols may be transmitted using a single-carrier waveform.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 as described with reference to FIG. 12. The transmitter 1020 may include a single antenna, or it may include a set of antennas.

Figure 11:
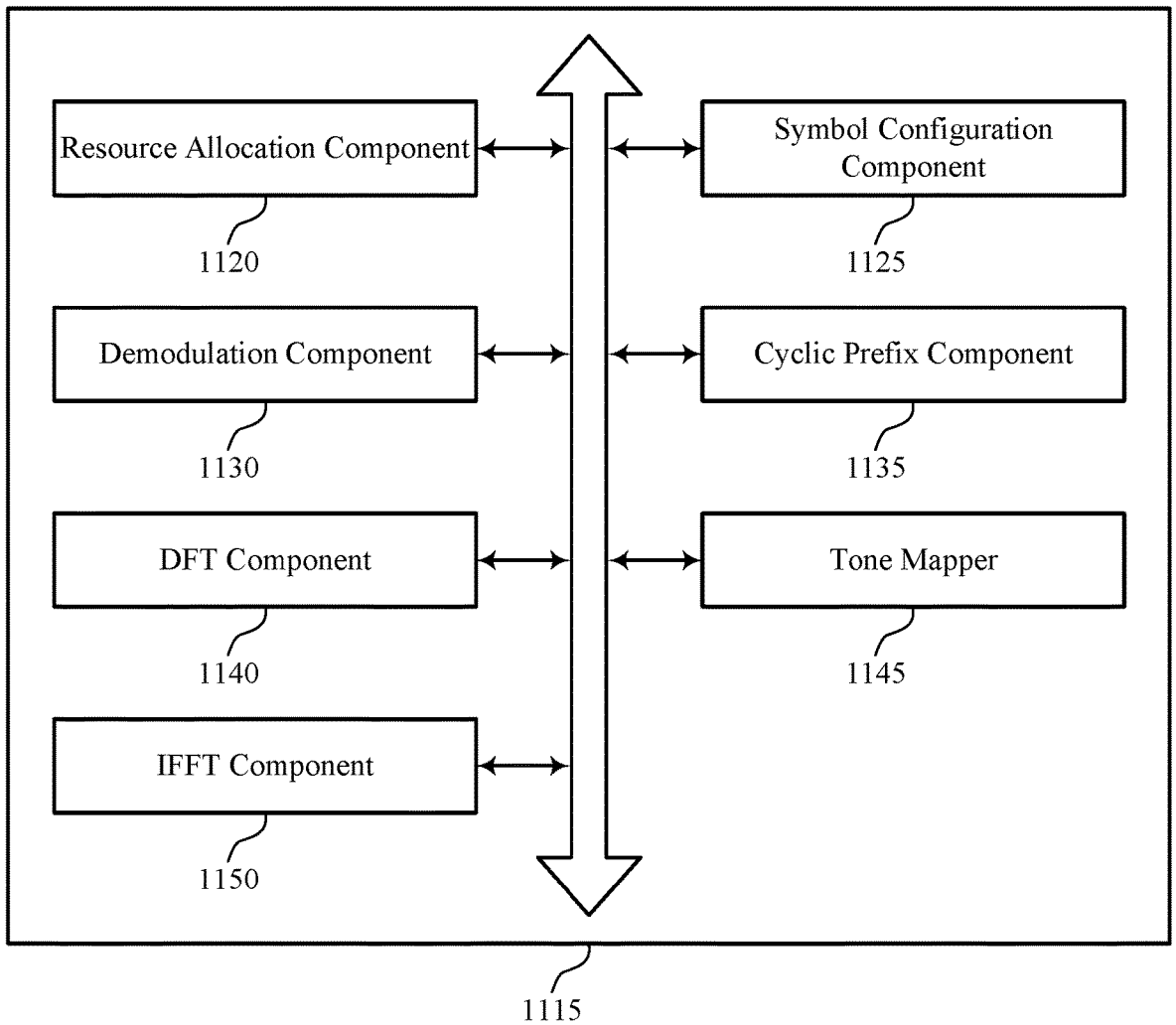

FIG. 11 shows a diagram 1100 of a communications manager 1115 that supports virtual symbol splitting techniques in wireless communications in accordance with one or more aspects of the present disclosure. The communications manager 1115 may be an example of aspects of a communications manager 915, a communications manager 1015, a UE communications manager 1215, or a base station communications manager 1315 as described with reference to FIGS. 9, 10, 12, and 13. The communications manager 1115 may include resource allocation component 1120, symbol configuration component 1125, demodulation component 1130, cyclic prefix component 1135, DFT component 1140, tone mapper 1145, and IFFT component 1150. Each of these modules may communicate, directly or indirectly, with one another (e.g., via one or more buses).

Resource allocation component 1120 may identify a pilot signal and a payload to be transmitted in a first full symbol, where the first full symbol may include a first symbol cyclic prefix, and in some cases for a second full symbol, and where a number of sub-symbols of the first full symbol is different than a number of sub-symbols of the second full symbol. In some cases, symbols may be transmitted using a single-carrier waveform.

Symbol configuration component 1125 may format the pilot signal and the payload in the time domain into separate sub-symbols that are nested within the first full symbol, where each sub-symbol may include an associated sub-symbol cyclic prefix, format the pilot signal in front of the payload to be transmitted, append a copy of the payload sub-symbol cyclic prefix to the end of the payload in the payload sub-symbol, and insert a copy of the identified payload sub-symbol tail portion in front of the pilot signal sub-symbol. In cases where virtually split symbols are being received, symbol configuration component 1125 may identify two or more nested sub-symbols within the first symbol, each nested sub-symbol having an associated sub-symbol cyclic prefix. In some cases, the sub-symbols include a first sub-symbol for transmission of the pilot signal and a second sub-symbol for transmission of the payload. In some cases, the sub-symbols include one or more sub-symbols for transmission of the pilot signal and one or more sub-symbols for transmission of the payload. In some cases, the identifying the payload sub-symbol tail portion and the inserting the copy of the identified payload sub-symbol tail portion are performed after the performing the IFFT.

Demodulation component 1130 may demodulate and decode the two or more nested sub-symbols based on the sub-symbol cyclic prefix associated with each sub-symbol when receiving virtually spilt symbols.

Cyclic prefix component 1135 may identify a first cyclic prefix length for the first symbol cyclic prefix, identify a sub-symbol cyclic prefix length as the first cyclic prefix length divided by a number of the separate sub-symbols, identify a tail portion of the pilot signal having the sub-symbol cyclic prefix length as a payload sub-symbol cyclic prefix, and identify a payload sub-symbol tail portion having the first cyclic prefix length. In some cases, the sub-symbol cyclic prefix length is identified as the first cyclic prefix length divided by a ratio of a number of DFT samples to a number of IFFT samples. In some cases, the first symbol cyclic prefix has a first cyclic prefix length and each sub-symbol cyclic prefix has a sub-symbol cyclic prefix length that corresponds to the first cyclic prefix length divided by a number of the separate sub-symbols.

DFT component 1140 may perform a DFT on the pilot signal and the payload sub-symbol after the appending. In some cases, the DFT may be performed using a singular DFT common to pilot signal and the payload sub-symbol. In some cases, the DFT and the IFFT are performed using a first number of samples. In some cases, the DFT is performed using a first number of samples, and the IFFT performed using a second number of samples that is larger than the first number of samples.

Tone mapper 1145 may perform tone mapping the DFT output. In some cases, a tone spacing of each of the separate sub-symbols is the same as a tone spacing of one or more other symbols that do not have nested sub-symbols. IFFT component 1150 may perform an IFFT on the tone-mapped DFT output.

Figure 12:
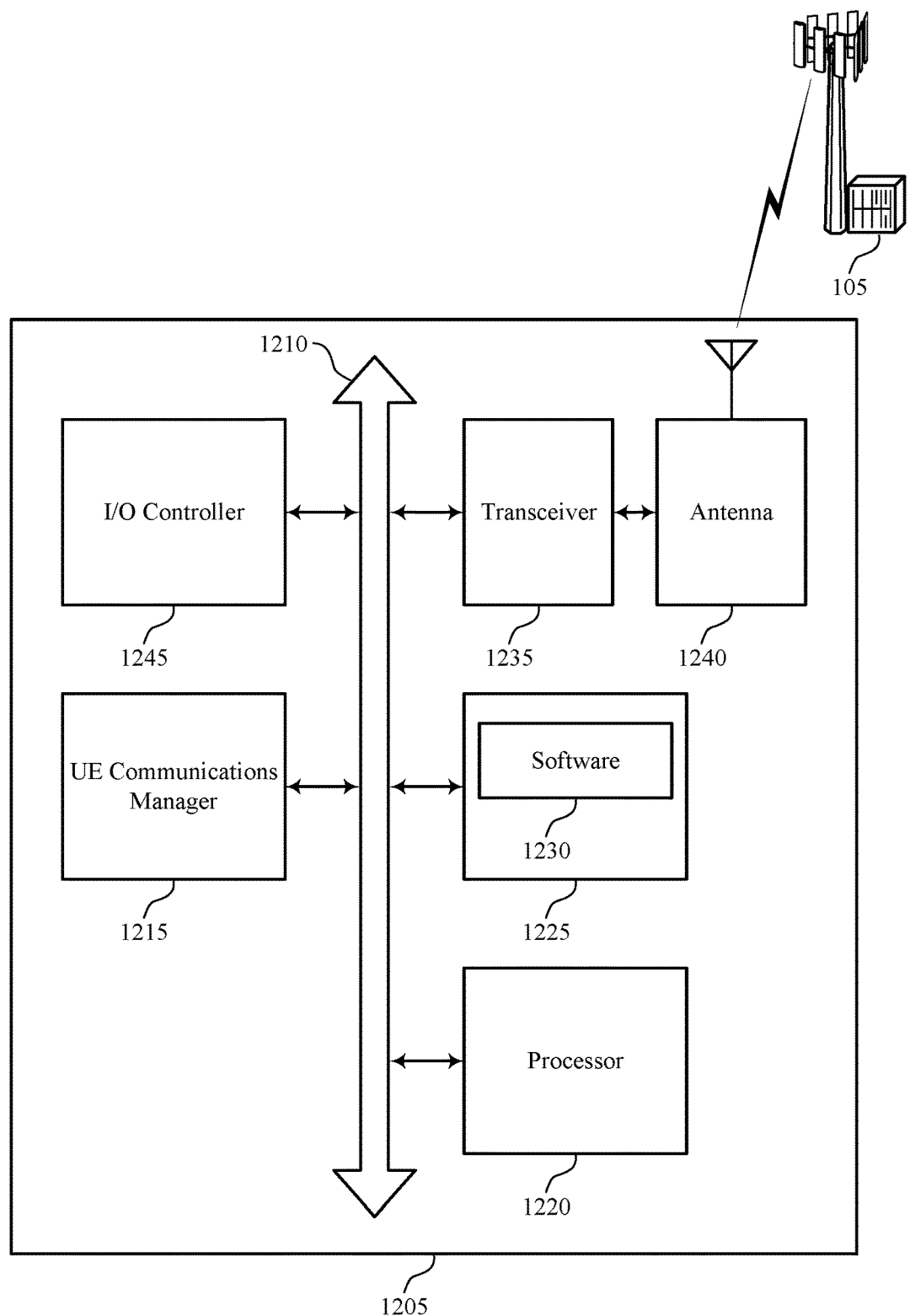
FIG. 12 illustrates a diagram of a system including a device that supports virtual symbol splitting techniques in wireless communications in accordance with one or more aspects of the present disclosure.

FIG. 12 shows a diagram of a system 1200 including a device 1205 that supports virtual symbol splitting techniques in wireless communications in accordance with one or more aspects of the present disclosure. Device 1205 may be an example of or include the components of device 905, device 1005, or a UE 115 as described with reference to, e.g., FIGS. 1, 2, 9 and 10. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting virtual symbol splitting techniques in wireless communications).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support virtual symbol splitting techniques in wireless communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system.

Figure 13:
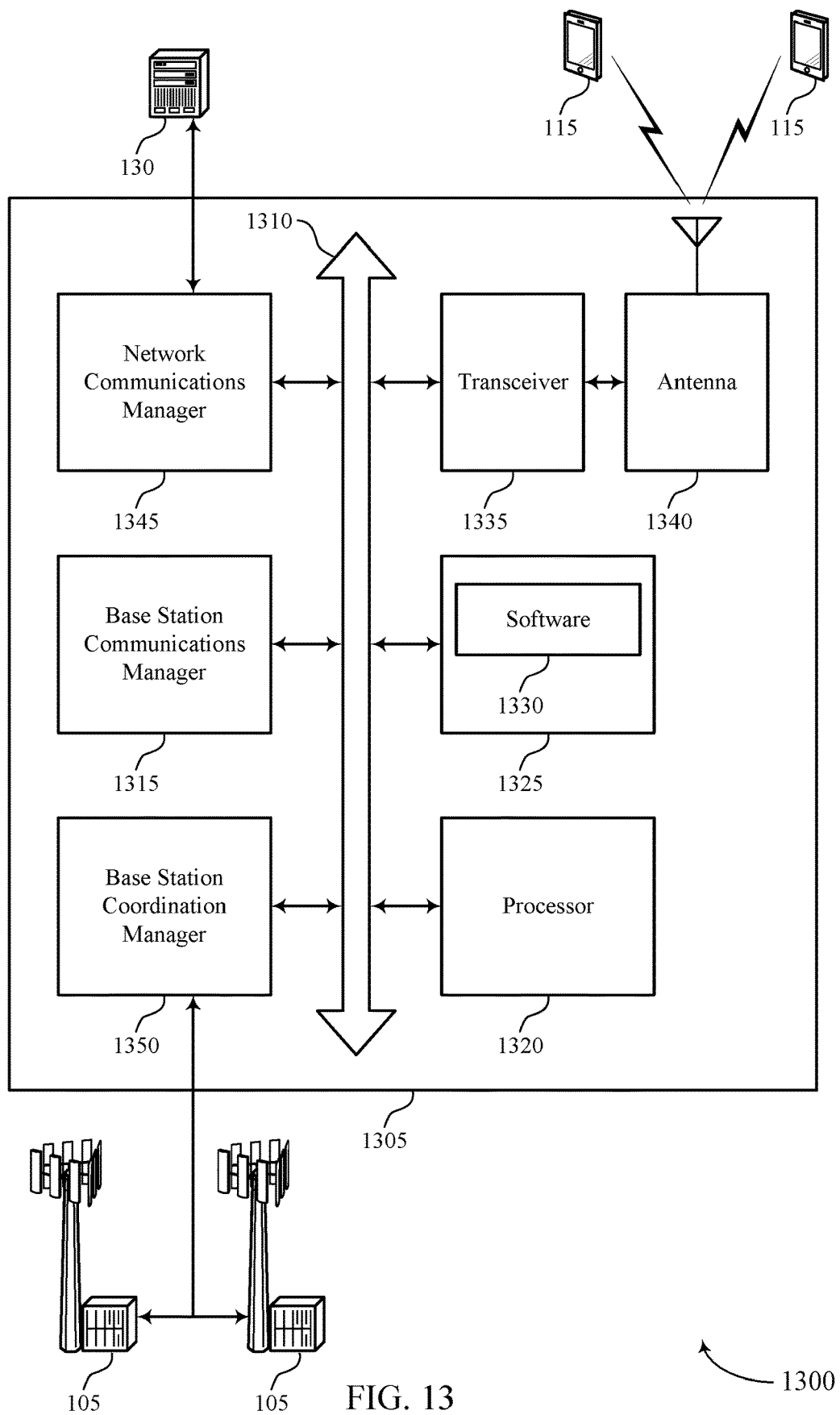
FIG. 13 illustrates a diagram of a system including a device that supports virtual symbol splitting techniques in wireless communications in accordance with one or more aspects of the present disclosure.

FIG. 13 shows a diagram of a system 1300 including a device 1305 that supports virtual symbol splitting techniques in wireless communications in accordance with one or more aspects of the present disclosure. Device 1305 may be an example of or include the components of device 905, device 1005, or a base station 105 as described with reference to, e.g., FIGS. 1, 2, 9, and 10. Device 1305 may include components for bi-directional voice and data communications including components for transmitting and receiving communications, including base station communications manager 1315, processor 1320, memory 1325, software 1330, transceiver 1335, antenna 1340, network communications manager 1345, and base station coordination manager 1350. These components may be in electronic communication via one or more busses (e.g., bus 1310). Device 1305 may communicate wirelessly with one or more UEs 115.

Base station coordination manager 1350 may manage communications with other base station 105, and may include a controller or scheduler for controlling communications with UEs 115 in cooperation with other base stations 105. For example, the base station coordination manager 1350 may coordinate scheduling for transmissions to UEs 115 for various interference mitigation techniques such as beamforming or joint transmission. In some examples, base station coordination manager 1350 may provide an X2 interface within an LTE/LTE-A or NR wireless communication network technology to provide communication between base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting virtual symbol splitting techniques in wireless communications).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware and/or software operation such as the interaction with peripheral components or devices.

Software 1330 may include code to implement aspects of the present disclosure, including code to support virtual symbol splitting techniques in wireless communications. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Figure 14:
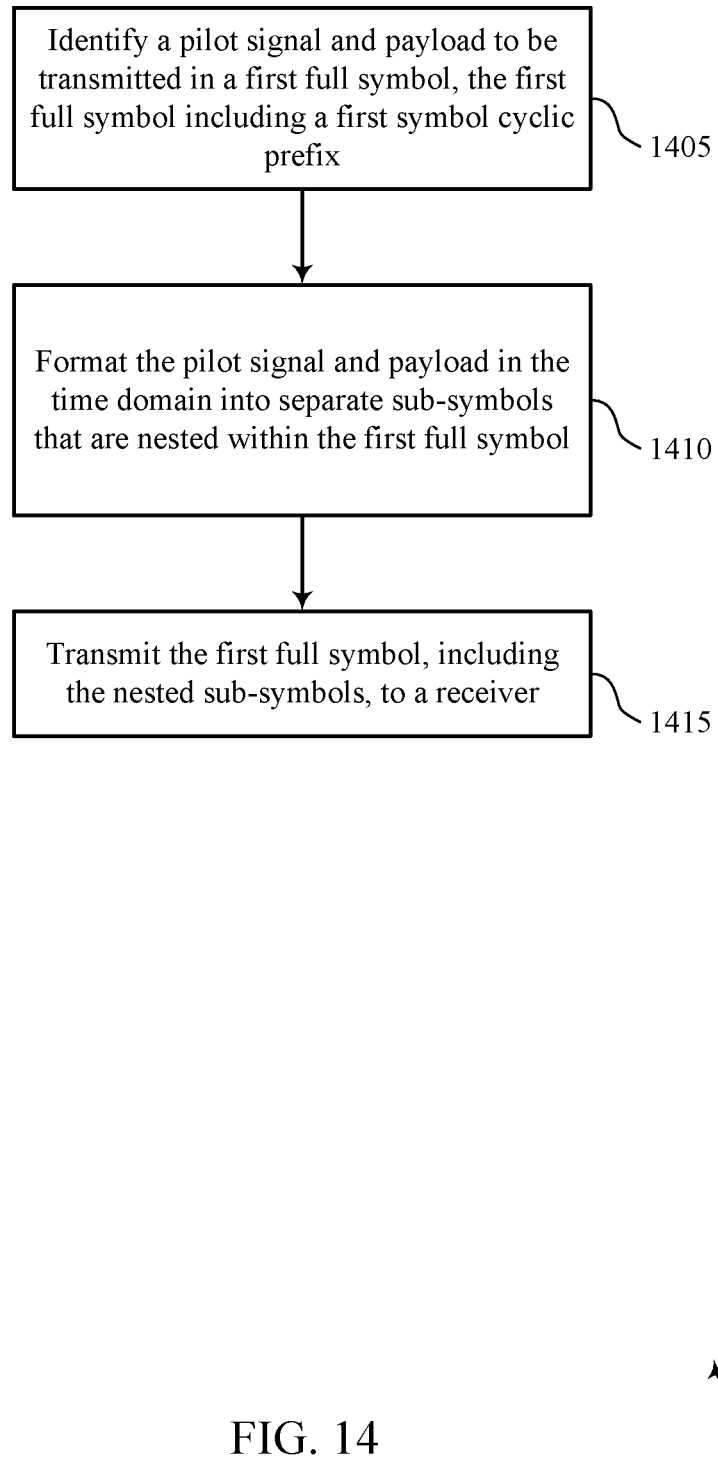
FIGS. 14 through 16 show flowcharts illustrating methods for virtual symbol splitting techniques in wireless communications in accordance with one or more aspects of the present disclosure.

FIG. 14 shows a flowchart illustrating a method 1400 for virtual symbol splitting techniques in wireless communications in accordance with one or more aspects of the present disclosure. The operations of method 1400 may be implemented by a UE 115 or base station 105 or its components as described herein. For example, the operations of method 1400 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At 1405 the UE 115 or base station 105 may identify a pilot signal and a payload to be transmitted in a first full symbol, where the first full symbol may include a first symbol cyclic prefix. The operations of 1405 may be performed according to the methods as described with reference to FIGS. 1 through 8. In certain examples, aspects of the operations of 1405 may be performed by a resource allocation component as described with reference to FIGS. 9 through 11.

At 1410 the UE 115 or base station 105 may format the pilot signal and the payload in the time domain into separate sub-symbols that are nested within the first full symbol. In some cases, the sub-symbols may include an associated sub-symbol cyclic prefix. The operations of 1410 may be performed according to the methods as described with reference to FIGS. 1 through 8. In certain examples, aspects of the operations of 1410 may be performed by a symbol configuration component as described with reference to FIGS. 9 through 11.

At 1415 the UE 115 or base station 105 may transmit the first full symbol, including the nested sub-symbols, to a receiver. The operations of 1415 may be performed according to the methods as described with reference to FIGS. 1 through 8. In certain examples, aspects of the operations of 1415 may be performed by a transmitter as described with reference to FIGS. 9 through 11.

Figure 15:
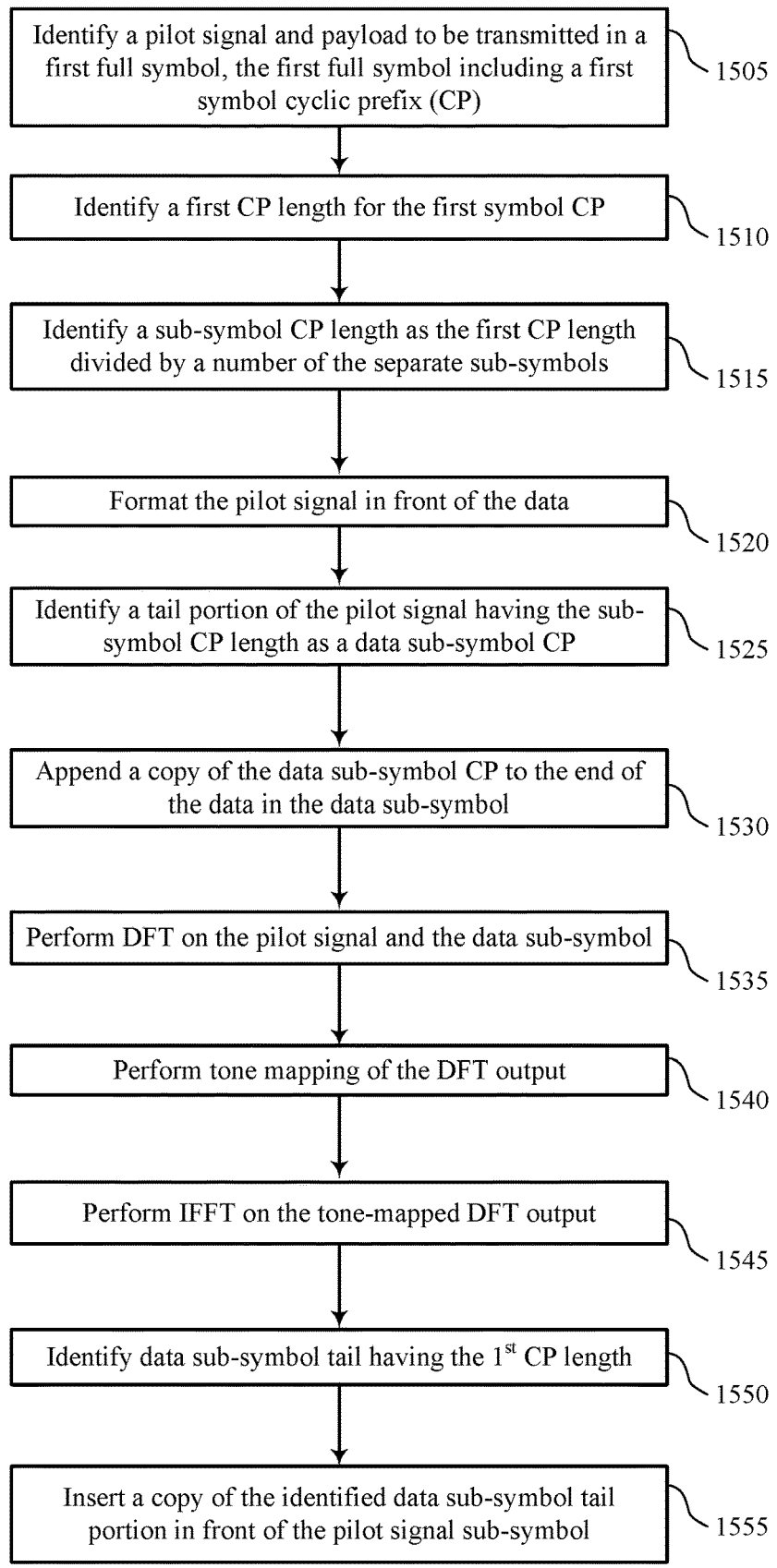

FIG. 15 shows a flowchart illustrating a method 1500 for virtual symbol splitting techniques in wireless communications in accordance with one or more aspects of the present disclosure. The operations of method 1500 may be implemented by a UE 115 or base station 105 or its components as described herein. For example, the operations of method 1500 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At 1505 the UE 115 or base station 105 may identify a pilot signal and a payload to be transmitted in a first full symbol, where the first full symbol may include a first symbol cyclic prefix. The operations of 1505 may be performed according to the methods as described with reference to FIGS. 1 through 8. In certain examples, aspects of the operations of 1505 may be performed by a resource allocation component as described with reference to FIGS. 9 through 11.

At 1510 the UE 115 or base station 105 may identify a first cyclic prefix length for the first symbol cyclic prefix. The operations of 1510 may be performed according to the methods described with reference to FIGS. 1 through 8. In certain examples, aspects of the operations of 1510 may be performed by a cyclic prefix component as described with reference to FIGS. 9 through 11.

At 1515 the UE 115 or base station 105 may identify a sub-symbol cyclic prefix length as the first cyclic prefix length divided by a number of the separate sub-symbols. The operations of 1515 may be performed according to the methods as described with reference to FIGS. 1 through 8. In certain examples, aspects of the operations of 1515 may be performed by a cyclic prefix component as described with reference to FIGS. 9 through 11.

At 1520 the UE 115 or base station 105 may format the pilot signal in front of the payload to be transmitted. The operations of 1520 may be performed according to the methods described with reference to FIGS. 1 through 8. In certain examples, aspects of the operations of 1520 may be performed by a symbol configuration component as described with reference to FIGS. 9 through 11.

At 1525 the UE 115 or base station 105 may identify a tail portion of the pilot signal having the sub-symbol cyclic prefix length as a payload sub-symbol cyclic prefix. The operations of 1525 may be performed according to the methods as described with reference to FIGS. 1 through 8. In certain examples, aspects of the operations of 1525 may be performed by a cyclic prefix component as described with reference to FIGS. 9 through 11.

At 1530 the UE 115 or base station 105 may append a copy of the payload sub-symbol cyclic prefix to the end of the payload in the payload sub-symbol. The operations of 1530 may be performed according to the methods described with reference to FIGS. 1 through 8. In certain examples, aspects of the operations of 1530 may be performed by a symbol configuration component as described with reference to FIGS. 9 through 11.

At 1535 the UE 115 or base station 105 may perform a DFT on the pilot signal and the payload sub-symbol after the appending. In some cases, the DFT may be performed using a singular DFT common to pilot signal and the payload sub-symbol. The operations of 1535 may be performed according to the methods as described with reference to FIGS. 1 through 8. In certain examples, aspects of the operations of 1535 may be performed by a DFT component as described with reference to FIGS. 9 through 11.

At 1540 the UE 115 or base station 105 may perform tone mapping the DFT output. The operations of 1540 may be performed according to the methods described with reference to FIGS. 1 through 8. In certain examples, aspects of the operations of 1540 may be performed by a tone mapper as described with reference to FIGS. 9 through 11.

At 1545 the UE 115 or base station 105 may perform an IFFT on the tone-mapped DFT output. The operations of 1545 may be performed according to the methods as described with reference to FIGS. 1 through 8. In certain examples, aspects of the operations of 1545 may be performed by a IFFT component as described with reference to FIGS. 9 through 11.

At 1550 the UE 115 or base station 105 may identify a payload sub-symbol tail portion having the first cyclic prefix length. The operations of 1550 may be performed according to the methods as described with reference to FIGS. 1 through 8. In certain examples, aspects of the operations of 1550 may be performed by a cyclic prefix component as described with reference to FIGS. 9 through 11.

At 1555 the UE 115 or base station 105 may insert a copy of the identified payload sub-symbol tail portion in front of the pilot signal sub-symbol. The operations of 1555 may be performed according to the methods as described with reference to FIGS. 1 through 8. In certain examples, aspects of the operations of 1555 may be performed by a symbol configuration component as described with reference to FIGS. 9 through 11.

Figure 16:
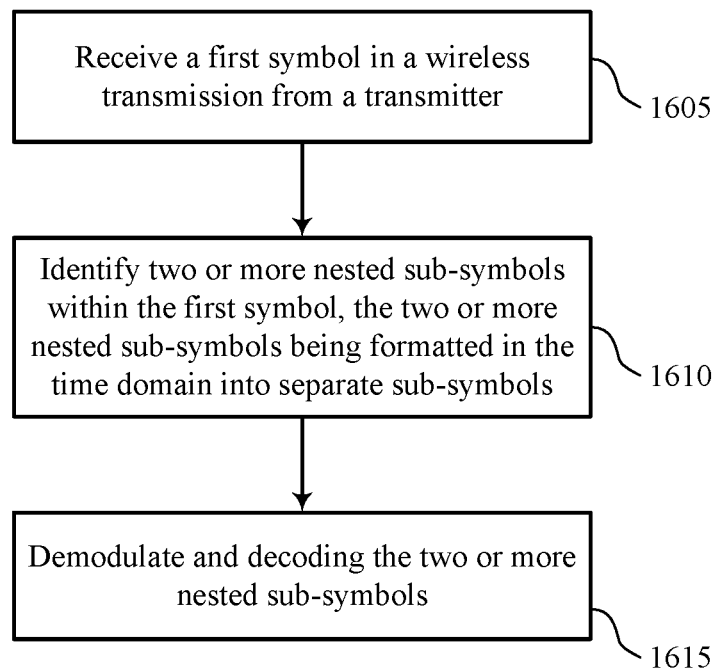

FIG. 16 shows a flowchart illustrating a method 1600 for virtual symbol splitting techniques in wireless communications in accordance with one or more aspects of the present disclosure. The operations of method 1600 may be implemented by a UE 115 or base station 105 or its components as described herein. For example, the operations of method 1600 may be performed by a communications manager as described with reference to FIGS. 9 through 11. In some examples, a UE 115 or base station 105 may execute a set of codes to control the functional elements of the device to perform the functions described below. Additionally or alternatively, the UE 115 or base station 105 may perform aspects the functions described below using special-purpose hardware.

At 1605 the UE 115 or base station 105 may receive a first symbol in a wireless transmission from a transmitter. In some cases, the first symbol may include a first symbol cyclic prefix. The operations of 1605 may be performed according to the methods as described with reference to FIGS. 1 through 8. In certain examples, aspects of the operations of 1605 may be performed by a receiver as described with reference to FIGS. 9 through 11.

At 1610 the UE 115 or base station 105 may identify two or more nested sub-symbols within the first symbol, where the two or more nested sub-symbols may be formatted in the time domain into separate sub-symbols. In some cases, the nested sub-symbol may have an associated sub-symbol cyclic prefix. The operations of 1610 may be performed according to the methods as described with reference to FIGS. 1 through 8. In certain examples, aspects of the operations of 1610 may be performed by a symbol configuration component as described with reference to FIGS. 9 through 11.

At 1615 the UE 115 or base station 105 may demodulate and decoding the two or more nested sub-symbols. In some cases, the demodulating and decoding may be based on a sub-symbol cyclic prefix associated with each sub-symbol. The operations of 1615 may be performed according to the methods as described with reference to FIGS. 1 through 8. In certain examples, aspects of the operations of 1615 may be performed by a demodulation component as described with reference to FIGS. 9 through 11.

In some examples, aspects from two or more of the described methods may be combined. It should be noted that the methods are just example implementations, and that the operations of the methods may be rearranged or otherwise modified such that other implementations are possible.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). 3GPP LTE and LTE-Advanced (LTE-A) are releases of UMTS that use E-UTRA. UTRA, E-UTRA, UMTS, LTE, LTE-A, and GSMare described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like. A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells, and may also support communications using one or multiple component carriers.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 as described with reference to FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C., as well as any combination with multiples of the same element (e.g., A-A A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying a pilot signal and a payload to be transmitted in a first full DFT-s-OFDM symbol, the first full DFT-s-OFDM symbol including a first symbol cyclic prefix;
    formatting the pilot signal and the payload in a time domain into separate sub-symbols that are nested within the first full DFT-s-OFDM symbol, wherein the sub-symbols include one or more sub-symbols for transmission of the pilot signal and one or more sub-symbols for transmission of the payload; and
    transmitting the first full DFT-s-OFDM symbol, including the nested sub-symbols and the first symbol cyclic prefix, to a receiver, wherein the first symbol cyclic prefix is outside of the nested sub-symbols in the first full DFT-s-OFDM symbol.

2. A method for wireless communication, comprising:
    identifying a pilot signal and a payload to be transmitted in a first full DFT-s-OFDM symbol, the first full DFT-s-OFDM symbol including a first symbol cyclic prefix;
    formatting the pilot signal and the payload in a time domain into separate sub-symbols that are nested within the first full DFT-s-OFDM symbol;
    performing a same discrete Fourier transform (DFT) on the pilot signal and the payload to obtain a DFT output;
    tone mapping the DFT output;
    performing an inverse fast Fourier transform (IFFT) on the tone-mapped DFT output; and
    transmitting the first full DFT-s-OFDM symbol, including the nested sub-symbols, to a receiver.

3. The method of claim 2, wherein a sub-symbol cyclic prefix length is identified as a first cyclic prefix length divided by a ratio of a first number of samples for an inverse fast Fourier transform (IFFT) to a second number of samples for the DFT.

4. The method of claim 1, wherein the payload comprises data, control information, or any combination thereof.

5. A method for wireless communication, comprising:
    identifying a pilot signal and a payload to be transmitted in a first full DFT-s-OFDM symbol, the first full DFT-s-OFDM symbol including a first symbol cyclic prefix;
    formatting the pilot signal and the payload in a time domain into separate sub-symbols that are nested within the first full DFT-s-OFDM symbol, comprising:
        determining a length of the formatted pilot signal and a length of the formatted payload such that a ratio of the length of the formatted pilot signal to a length of the formatted payload is an integer; and
    transmitting the first full DFT-s-OFDM symbol, including the nested sub-symbols, to a receiver.

6. The method of claim 1, wherein each sub-symbol includes an associated sub-symbol cyclic prefix.

7. A method for wireless communication, comprising:
    identifying a pilot signal and a payload to be transmitted in a first full DFT-s-OFDM symbol, the first full DFT-s-OFDM symbol including a first symbol cyclic prefix;
    formatting the pilot signal and the payload in a time domain into separate sub-symbols that are nested within the first full DFT-s-OFDM symbol; and
    transmitting the first full DFT-s-OFDM symbol, including the nested sub-symbols, to a receiver; and
    repeating the identifying, formatting, and transmitting for a second full DFT-s-OFDM symbol, and wherein a number of sub-symbols of the first full DFT-s-OFDM symbol is different than a number of sub-symbols of the second full DFT-s-OFDM symbol.

8. The method of claim 1, wherein the first full DFT-s-OFDM symbol is transmitted using a single-carrier waveform.

9. An apparatus for wireless communication, comprising:
    a processor;
    memory coupled with the processor; and
    the processor and memory configured to:
        identify a pilot signal and a payload to be transmitted in a first full DFT-s-OFDM symbol, the first full DFT-s-OFDM symbol including a first symbol cyclic prefix;
        format the pilot signal and the payload in the time domain into separate sub-symbols that are nested within the first full DFT-s-OFDM symbol; and transmit the first full DFT-s-OFDM symbol, including the nested sub-symbols and the first symbol cyclic prefix, to a receiver, wherein the first symbol cyclic prefix is outside of the nested sub-symbols in the first full DFT-s-OFDM symbol.

10. The apparatus of claim 9, wherein the sub-symbols include one or more sub-symbols for transmission of the pilot signal and one or more sub-symbols for transmission of the payload.

11. An apparatus for wireless communication, comprising:
   a processor;
   memory coupled with the processor; and
   the processor and memory configured to:
      identify a pilot signal and a payload to be transmitted in a first full DFT-s-OFDM symbol, the first full DFT-s-OFDM symbol including a first symbol cyclic prefix;
      format the pilot signal and the payload in the time domain into separate sub-symbols that are nested within the first full DFT-s-OFDM symbol;
      perform a same discrete Fourier transform (DFT) on the pilot signal and the payload to obtain a DFT output;
      tone map the DFT output;
      perform an inverse fast Fourier transform (IFFT) on the tone-mapped DFT output; and
      transmit the first full DFT-s-OFDM symbol, including the nested sub-symbols, to a receiver.

12. The apparatus of claim 9, wherein the payload comprises data, control information, or any combination thereof.

* * * * *